(12) United States Patent
Naruse

(10) Patent No.: US 11,435,297 B2
(45) Date of Patent: Sep. 6, 2022

(54) IMAGE CAPTURE METHOD AND IMAGE CAPTURE DEVICE

(71) Applicant: OMRON Corporation, Kyoto (JP)

(72) Inventor: Yosuke Naruse, Uji (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/270,438

(22) PCT Filed: Oct. 25, 2019

(86) PCT No.: PCT/JP2019/041849
§ 371 (c)(1),
(2) Date: Feb. 23, 2021

(87) PCT Pub. No.: WO2020/095712
PCT Pub. Date: May 14, 2020

(65) Prior Publication Data
US 2021/0247324 A1    Aug. 12, 2021

(30) Foreign Application Priority Data

Nov. 9, 2018  (JP) .............................. JP2018-211495

(51) Int. Cl.
*G01N 21/88* (2006.01)
*G06T 7/00* (2017.01)
*G06N 20/00* (2019.01)

(52) U.S. Cl.
CPC ..... *G01N 21/8806* (2013.01); *G01N 21/8851* (2013.01); *G06N 20/00* (2019.01); *G06T 7/0004* (2013.01)

(58) Field of Classification Search
CPC ........... G01N 21/8806; G01N 21/8851; G06N 20/00; G06T 7/0004
See application file for complete search history.

(56) References Cited

U.S. PATENT DOCUMENTS

2011/0298901 A1* 12/2011 Derrien ................ G05B 19/401
348/E13.074

FOREIGN PATENT DOCUMENTS

EP   2887055   6/2015
EP   3762794   1/2021
(Continued)

OTHER PUBLICATIONS

"International Search Report (Form PCT/ISA/210) of PCT/JP2019/041849," dated Jan. 7, 2019, with English translation thereof, pp. 1-2.

(Continued)

*Primary Examiner* — Jamil Ahmed
(74) *Attorney, Agent, or Firm* — JCIPRNET

(57) ABSTRACT

Provided is an image capture method including: illuminating an object having known label data, capturing images of the object using illumination parameters, and acquiring captured images; generating an estimated image of the object at the time of illumination based on the illumination parameter on the basis of an image data set obtained by associating a captured image with an illumination parameter; setting a maximum number of captured images permitted for the object; and performing learning with a machine learning model for each number of images equal to or smaller than the maximum number of captured images, optimizing illumination parameters and inspection algorithm parameters on the basis of a result of comparison between a result of estimation of the machine learning model and the label data of the object, calculating an index representing inspection performance expected when the each number of images is captured, and presenting the index to a user.

10 Claims, 18 Drawing Sheets

(56) References Cited

FOREIGN PATENT DOCUMENTS

EP          3762795        1/2021
JP         2012514193      6/2012

OTHER PUBLICATIONS

"Written Opinion of the International Searching Authority (Form PCT/ISA/237) of PCT/JP2019/041849," dated Jan. 7, 2019, with English translation thereof, pp. 1-8.
"Search Report of Europe Counterpart Application", dated Jul. 7, 2022, p. 1-p. 8.

* cited by examiner

IMAGE CAPTURE METHOD AND IMAGE CAPTURE DEVICE

CROSS-REFERENCE TO RELATED APPLICATION

This application is a 371 application of the International PCT application serial no. PCT/JP2019/041849, filed on Oct. 25, 2019, which claims the priority benefit of Japan Patent Application No. 2018-211495, filed on Nov. 9, 2018. The entirety of each of the above-mentioned patent applications is hereby incorporated by reference herein and made a part of this specification.

TECHNICAL FIELD

The present invention relates to an image capture method and an image capture device for an object.

BACKGROUND ART

Visual inspection of products at manufacturing sites is one of the fields making the slowest progress in substitution of manpower by machines, and it is an important issue relating to automation that has to be dealt with against the decline in labor force in the future. Recently, due to development of technologies of artificial intelligence and machine learning represented by deep learning, automation technology for inspection has been rapidly improved. For example, Patent Literature 1 reports a technique of calculating an evaluation criterion from a captured image of an object (an inspection target) and iteratively obtaining image capturing/illumination parameters for maximizing and minimizing the evaluation criterion.

CITATION LIST

Patent Literature

[Patent Literature 1]
EP2887055A1

SUMMARY OF INVENTION

Technical Problem

However, the appearance of a defect varies depending on a way of illuminating an object, and if an excessive amount of illumination is applied at the same time, a defect essentially becomes invisible instead. Therefore, in order to detect desired defects of a plurality of kinds at the same time, it may be necessary to capture images a plurality of times while changing the way of illumination. Regarding such a case, in the related art, the way of setting illumination and the number of times of image capturing for being able to sufficiently detect a desired defect relied on manual adjustment, and it took a great deal of time for optimum design. On the other hand, when it is considered that the required number of captured images is automatically determined, the number of captured images is directly connected to a processing time or a processing speed (takt), and evaluation can be performed in a different viewpoint or with a different index. Therefore, it is difficult to automatically judge the degree of the increment in the number of captured images allowed in the system design, and it is difficult to keep a balance between the processing speed and a defect detection rate. In addition, there is similar problem not only in visual inspection of an object but also in judgment devices such as facial recognition systems based on different machine learning, for example.

Hence, an aspect of the present disclosure has been made in consideration of such circumstances, and an object thereof is to provide an image capture method and an image capture device capable of contributing to optimizing conditions for capturing an image of an object.

Solution to Problem

In order to solve the problems described above, the present invention employs the following configurations.

[1] Regarding an example of an image capture method according to the present disclosure, there is provided an image capture method used when inspecting an object using an inspection module including a machine learning model generated based on learning data including an image. The image capture method includes illuminating the object with a light source in which an illumination parameter during image capture of the object having known label data is able to be changed, capturing images of the object based on a plurality of the illumination parameters, and acquiring a plurality of captured images; generating an estimated image of the object at the time of illumination based on the illumination parameter on the basis of an image data set obtained by associating the captured images with the illumination parameter corresponding to the captured images; setting a maximum number of captured images permitted for the object; and using the estimated image corresponding to the illumination parameter and the label data of the object for learning performed with the machine learning model for each number of images equal to or smaller than the maximum number of captured images, optimizing the illumination parameter and an inspection algorithm parameter for the machine learning model on the basis of a result of comparison between a result of estimation performed with the machine learning model and the label data of the object, calculating an index representing inspection performance expected when the each number of images is captured, and presenting the index to a user.

For example, the maximum number of captured images permitted for an object may be set on the basis of an instruction of a user, or a predetermined number of images may be set in advance. In addition, "inspection algorithm parameters" in the present disclosure represent parameters for an inspection algorithm used when inspecting an object using a machine learning model.

In this configuration, optimizing the illumination parameters used when inspecting an object using the inspection module and the inspection algorithm parameters for the machine learning model is performed in a case in which images are captured for each number of images equal to or smaller than the maximum number of captured images permitted for the object (that is, for the number S of shots=1, 2, and so on to Smax−1, and Smax as the number of captured images when the maximum number of captured images is Smax; however, an increment in S is not limited to 1), an index representing inspection performance expected when the each number of images is captured is calculated, and the index is presented to a user. Thus, a user can check the presented indices and determine a desired number of captured images while taking a processing time or a processing speed (takt) into account. Therefore, image capturing conditions can be efficiently optimized without relying on manual adjustment as in the related art. In addition, both the illumination parameters used when inspecting an object using the inspection module and the inspection algorithm parameters for the machine learning model can be optimized at the same time on the basis of a result of comparison between a result of estimation performed with the machine learning model and the label data of the object, and thus work of setting inspection conditions including the image capturing conditions can be simplified.

[2] In the foregoing configuration, the generating the estimated image of the object may include preparing a plurality of the corresponding image data sets for the objects of a plurality of kinds, and generating a plurality of the estimated images respectively corresponding to the objects of a plurality of kinds at the time of illumination based on the illumination parameter on the basis of the plurality of the image data sets. In this configuration, the image capturing conditions can be optimized in advance for each of the objects of a plurality of kinds, and thus, it is possible to more quickly inspect an object to which illumination for inspecting (for example, pattern light) is projected.

[3] In addition, regarding another example of the image capture method according to the present disclosure, there is provided an image capture method used when inspecting an object using an inspection module including a machine learning model generated based on learning data including an image. The image capture method includes illuminating the object with a light source in which an illumination parameter during image capture of the object having corresponding label data is able to be changed, capturing images of the object based on a plurality of the illumination parameters, and acquiring a plurality of captured images; generating an estimated image of the object at the time of illumination based on the illumination parameter on the basis of an image data set obtained by associating the captured images with the illumination parameter corresponding to the captured images; setting a maximum number of captured images permitted for the object; and using the estimated image corresponding to the illumination parameter for the machine learning model that has finished learning for each number of images equal to or smaller than the maximum number of captured images, optimizing only the illumination parameter on the basis of a result of comparison between a result of estimation performed with the machine learning model and the label data of the object, calculating an index representing inspection performance expected when the each number of images is captured, and presenting the index to a user. Also in the configuration, for example, the maximum number of captured images permitted for an object may be set on the basis of an instruction of a user, or a predetermined number of images may be set in advance.

Also in this configuration, optimizing the illumination parameter used when inspecting an object using the inspection module is performed in a case in which images are captured for each number of images equal to or smaller than the maximum number of captured images permitted for the object, an index representing inspection performance expected when the each number of images is captured is calculated, and the index is presented to a user. Thus, a user can check the presented indices and determine a desired number of captured images while taking a processing time or a processing speed (takt) into account. Therefore, image capturing conditions can be efficiently optimized without relying on manual adjustment as in the related art. In addition, a method in which the inspection algorithm parameters are settled in advance and then the illumination parameters are settled based on the estimated images can be adopted. Therefore, a computation amount during learning performed with the machine learning model can be reduced, a load on a system performing computation can be reduced, and an operation of setting the illumination parameters can be simplified.

[4] In the foregoing configuration, the using the estimated image for the machine learning model that has finished learning may include using learning data including the estimated image and label data showing a corresponding to-be-inspected feature of the object for additional learning performed with the machine learning model, and updating some or all of inspection algorithm parameters for the machine learning model; and matching the result of estimation of the machine learning model and the label data to each other by optimizing some or all of the inspection algorithm parameters for the machine learning model and the illumination parameters. In this configuration, as a second stage in the image capture method according to [3] described above, some or all of the inspection algorithm parameters and the illumination parameters can be optimized at the same time, and thus the machine learning model can obtain more favorable results of learning.

[5] In the foregoing configuration, the optimizing the illumination parameter may include selecting the illumination parameter that minimizes a loss function showing the result of comparison, and the selecting may indicate selecting the illumination parameter that minimizes the loss function in terms of an average loss value of the illumination parameter within a predetermined range. In this configuration, by taking the illumination parameter within a predetermined range into account, it is possible to enhance robustness with respect to environmental change when an object is detected.

[6] In the foregoing configuration, the generating the estimated image of the object may include generating the estimated image of the object on the basis of a sum total of weighted linear superposition of the captured images settled on the basis of the illumination parameter and the captured images included in the image data set. In this configuration, it is possible to imitate the estimated images of an object in circumstances of linear illumination.

[7] In the foregoing configuration, the generating the estimated image of the object may include generating the estimated image of the object using a nonlinear estimated function relating to the illumination parameter on the basis of the image data set. In this configuration, it is possible to imitate the estimated images of an object with nonlinear illumination, and it is possible to improve generality (versatility) of the inspection module.

[8] In the foregoing configuration, indices of a plurality of kinds may be calculated as indices representing the inspection performance and may be presented to the user. In this configuration, information for judgment when a user determines or selects the image capturing conditions (the number of captured images) increases, and thus the image capturing conditions can be optimized more preferably.

[9] Regarding an example of an image capture device according to the present disclosure, there is provided an image capture device used when inspecting an object using an inspection module including a machine learning model generated based on learning data including an image. The image capture device includes an acquisition unit that illuminates the object with a light source in which an illumination parameter during image capture of the object having known label data is able to be changed, captures images of the object based on a plurality of the illumination parameters, and acquires a plurality of captured images; a generation unit that generates an estimated image of the object at the time of illumination based on the illumination parameter on the basis of an image data set obtained by associating the captured images with the illumination parameter corresponding to the captured images; a setting unit that sets a maximum number of captured images permitted for the object; and a control unit that uses the estimated image corresponding to the illumination parameter and the label data of the object for learning performed with the machine learning model for each number of images equal to or smaller than the maximum number of captured images, optimizes the illumination parameter and an inspection algorithm parameter for the machine learning model on the basis of a result of comparison between a result of estimation performed with the machine learning model and the label data of the object, calculates an index representing inspection performance expected when the each number of images is captured, and presents the index to a user.

[10] Regarding another example of the image capture device according to the present disclosure, there is provided an image capture device used when inspecting an object using an inspection module including a machine learning model generated based on learning data including an image. The image capture device includes an acquisition unit that illuminates the object with a light source in which an illumination parameter during image capture of the object having corresponding label data is able to be changed, captures images of the object based on a plurality of the illumination parameters, and acquires a plurality of captured images; a generation unit that generates an estimated image of the object at the time of illumination based on the illumination parameter on the basis of an image data set obtained by associating the captured images with the illumination parameter corresponding to the captured images; a setting unit that sets a maximum number of captured images permitted for the object; and a control unit that uses the estimated image corresponding to the illumination parameter for the machine learning model that has finished learning for each number of images equal to or smaller than the maximum number of captured images, optimizes only the illumination parameter on the basis of a result of comparison between a result of estimation performed with the machine learning model and the label data of the object, calculates an index representing inspection performance expected when the each number of images is captured, and presents the index to a user.

In the present disclosure, "a unit" and "a device" denote not only a physical means but also include configurations in which functions of "the unit" and "the device" are realized by software. In addition, functions of one "unit" and one "device" may be realized by two or more physical means or devices. Alternatively, functions of two or more "units" and "devices" may be realized by one physical means or one device. Moreover, for example, conceptually, "a unit" and "a device" can be also rephrased with "a means" and "a system".

Effects of Invention

According to the present disclosure, optimizing the illumination parameters used when inspecting an object using the inspection module and the inspection algorithm parameters for the machine learning model is performed in a case in which images are captured for each number of images equal to or smaller than the maximum number of captured images permitted for the object, an index representing inspection performance expected when the each number of images is captured is calculated, and the index is presented to a user. Thus, a user can check the presented indices and determine a desired number of captured images while taking a processing time or a processing speed (takt) into account. Therefore, image capturing conditions can be efficiently optimized without relying on manual adjustment as in the related art. In other words, change in inspection performance when the number of captured images (that is, a takt) is changed after decision performance itself of a decision algorithm in machine learning is directly evaluated can be presented to a user in advance. Therefore, when optimizing a balance between achievement of a desired detection rate relating to a defect or the like of an object and the takt, it is possible to be free from trouble such as trial and error relying on human hands.

Further, the number of captured images and a storage capacity necessary for such optimizing can be reduced. In addition, regarding image capturing conditions such as linearity of illumination which can hardly be imitated, optimizing can be reliably performed by securing a predetermined number of captured images. Moreover, man-hours for design can be shortened, systematic design can be performed, and it is possible to prevent reliance on human in which inspection performance relies on a skill of manpower. Furthermore, it is possible to perform direct optimization for an image capturing/image processing system in its entirety, such as illumination design favorable for an inspection algorithm and an optimal inspection algorithm for the illumination.

DESCRIPTION OF EMBODIMENT

Figure 1:
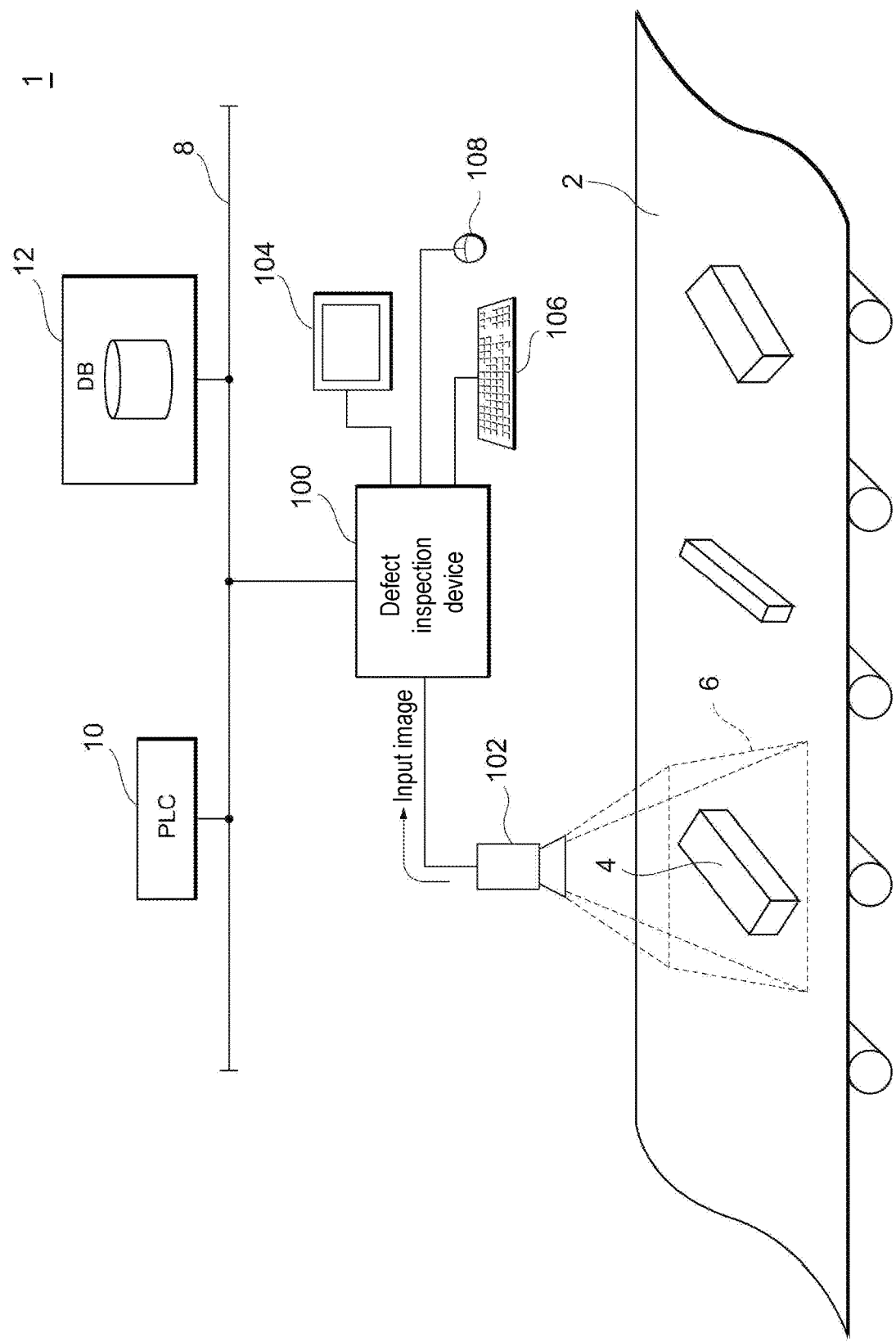
FIG. 1 is a plan view (partial perspective view) schematically illustrating an example of a scene in which an image capture device according to an embodiment of the present disclosure is applied (an example of a configuration of a system).

Hereinafter, an embodiment according to an example of the present disclosure will be described with reference to the drawings. However, the embodiment described below is merely an example and is not intended to exclude application of various modifications and technologies which are not specified below. That is, the example of the present disclosure can be performed in various modifications within a range not departing from the gist thereof. In addition, in description of the following drawings, reference signs which are the same or similar are applied to parts which are the same or similar. The drawings are schematic diagrams and do not necessarily match actual dimensions, proportions, and the like. Moreover, parts differing from each other in dimensional relationship or proportion between the drawings may be included. In addition, it goes without saying that the embodiment described below is an embodiment of a portion of the present disclosure and is not all of the embodiment. Moreover, any other embodiments which can be obtained on the basis of the embodiment of the present disclosure by those skilled in the art without requiring any creative behavior are included in the protective range of the present disclosure.

§ 1 APPLICATION EXAMPLE

In the present disclosure, an object is illuminated with a plurality of light sources having variable illumination parameters, and a captured image is acquired by capturing an image of the object using a suitable image capturing means (image sensor). For example, the illumination parameters can include light emitting positions, light emitting intensities, chromaticity, and the like of the light sources. Further, a machine learning model is trained using estimated images generated by processing the obtained captured images. As a result, the machine learning model has an ability to inspect an object. The captured images or the estimated images are associated with the illumination parameters in advance, and optimizing can be performed by adjusting the illumination parameters and inspection algorithm parameters at the same time during training of the machine learning model. Further, the optimizing is performed in a case in which images are captured for each number of images equal to or smaller than a maximum number of captured images permitted for an object (that is, image capturing of a plurality of shots may be referred to as "multi-shot image capturing"), an index representing inspection performance expected when the each number of images is captured is calculated, and the index is presented to a user. A user can determine a desired number of captured images while taking a processing time or a processing speed (takt) into account by checking the presented indices. In addition, compared to a case in which only the illumination parameters are adjusted and then captured images for learning are acquired by performing illuminating based on the illumination parameters, an operation is simplified, and a load on the system can be reduced.

Here, first, using FIG. 1, an example of a scene in which an example of the present disclosure is applied will be described. FIG. 1 is a plan view (partial perspective view) schematically illustrating an example of a scene in which an image capture device according to the embodiment of the present disclosure is applied (an example of a configuration of the system). An inspection system 1 performs inspection of an inspection target on the basis of captured images generated by capturing images of the inspection target. Examples of this inspection target can include a workpiece on a line. Here, examples of inspection can include visual inspection or visual measurement of a workpiece.

That is, for example, the inspection system 1 realizes visual inspection or visual measurement of a workpiece 4 by executing image analysis processing with respect to input images obtained by capturing images of the workpiece 4 which is an inspection target conveyed on a belt conveyor 2. In the following description, regarding a typical example of image analysis processing, inspection or the like for the presence or absence of a defect on a surface of the workpiece 4 will be described as an application example, but examples are not limited thereto. For example, it can also be applied to identification of a kind of a defect, measurement of an external shape, and the like.

A camera 102 serving as an image sensor is disposed in an upper part of the belt conveyor 2, and an image-capturing visual field 6 of the camera 102 is constituted to include a predetermined region of the belt conveyor 2. Image data (which will hereinafter be referred to as "an input image") generated through image capturing by the camera 102 is transmitted to a defect inspection device 100. The camera 102 executes image capturing periodically or as an event.

The defect inspection device 100 includes a learning instrument having a convolutional neural network (CNN) engine. A feature detection image is generated for each class from the input image using the CNN engine. On the basis of a single or a plurality of generated feature detection images, the presence or absence or the like of a defect in a workpiece (target) is judged. Alternatively, the size, the position, or the like of a defect can also be detected.

The defect inspection device 100 is connected to a programmable controller (PLC) 10, a database device 12, and the like via a superordinate network 8. Detection results of the defect inspection device 100 may be transmitted to the PLC 10 and/or the database device 12. In addition to the PLC 10 and the database device 12, an arbitrary device may be connected to the superordinate network 8. In addition, a display 104 serving as an output unit for displaying a state during processing, detection results, and the like, and a keyboard 106 and a mouse 108, for example, serving as input units for receiving an operation of a user may be connected to the defect inspection device 100.

§ 2 EXAMPLE OF CONFIGURATION

[Configuration of Hardware]

Figure 2:
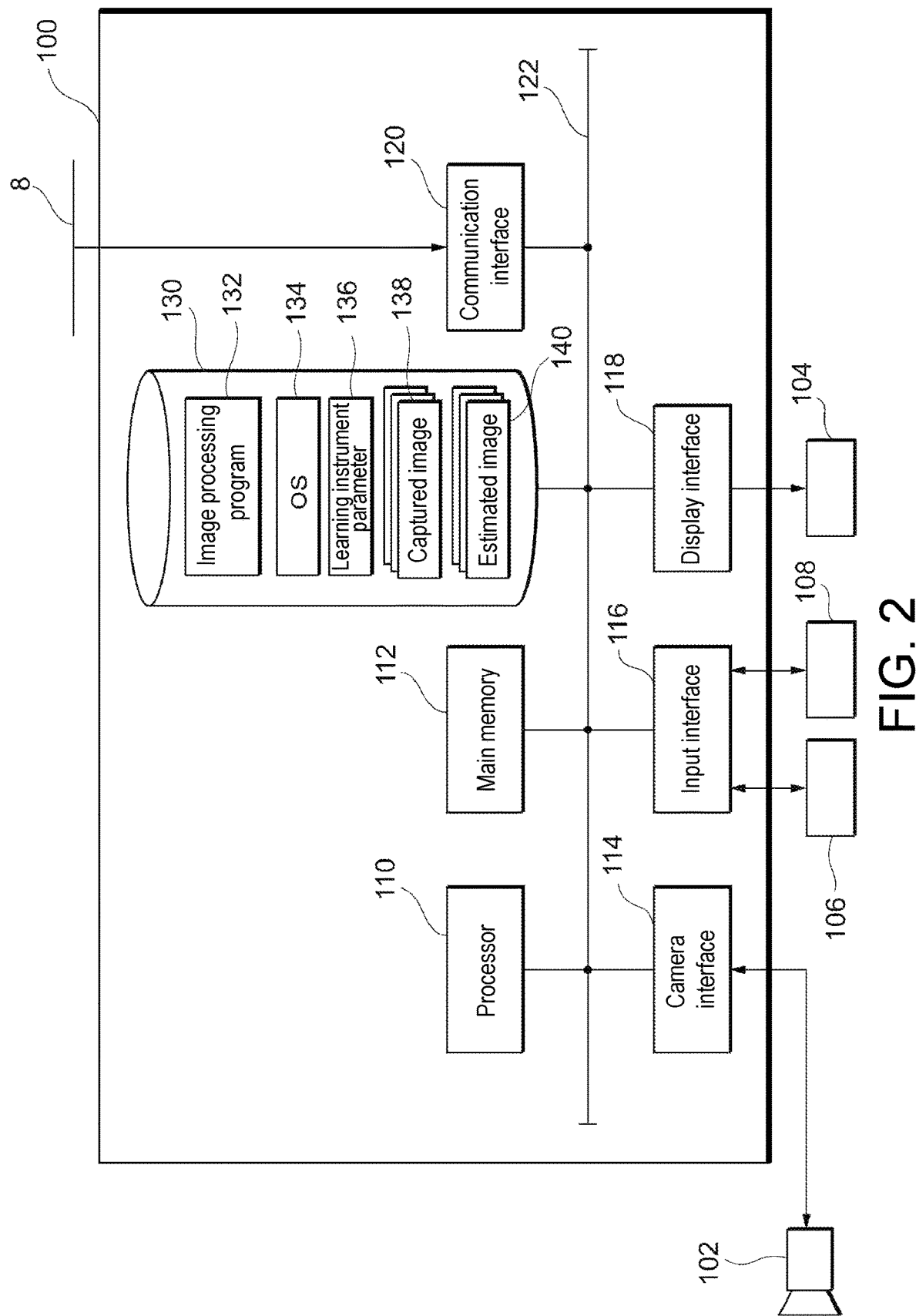
FIG. 2 is a plan view schematically illustrating a configuration of hardware of a defect inspection device included in the image capture device according to the embodiment of the present disclosure.

Next, using FIG. 2, an example of a configuration of hardware of the defect inspection device 100 included in the inspection system 1 that is the image capture device according to the embodiment of the present disclosure will be described. FIG. 2 is a plan view schematically illustrating a configuration of hardware of the defect inspection device 100.

As an example, the defect inspection device 100 may be realized using a versatile computer constituted along with a versatile computer architecture. The defect inspection device 100 includes a processor 110, a main memory 112, a camera interface 114, an input interface 116, a display interface 118, a communication interface 120, and a storage 130. Typically, these components are connected such that they can communicate with each other via an internal bus 122.

The processor 110 realizes functions and processing described below by deploying and executing a program stored in the storage 130 in the main memory 112. The main memory 112 is constituted of a volatile memory and functions as a work memory necessary for the processor 110 to execute the program.

The camera interface 114 is connected to the camera 102 and acquires input images (captured images 138) captured by the camera 102. The camera interface 114 may instruct the camera 102 of an image capturing timing or the like.

The input interface 116 is connected to the input units such as the keyboard 106 and the mouse 108 and acquires a command representing an operation or the like of a user with respect to the input units.

The display interface 118 outputs various processing results generated by the processor 110 executing the program to the display 104.

The communication interface 120 plays a role of performing processing for communicating with the PLC 10, the database device 12, and the like via the superordinate network 8.

The storage 130 stores programs such as an image processing program 132 and an operating system (OS) 134 for causing a computer to function as the defect inspection device 100. Moreover, the storage 130 may store a learning instrument parameter 136 for realizing image detection processing which will be described below, the captured images 138 that are input images acquired from the camera 102, and estimated images 140 which are measurement results obtained from the captured images 138. For example, the learning instrument parameter 136 can include various parameters such as the illumination parameters used for various machine learning models in a learning stage and an inspection stage, the inspection algorithm parameters, and the like.

The image processing program 132 stored in the storage 130 may be installed in the defect inspection device 100 via an optical recording medium such as a digital versatile disc (DVD), a semiconductor recording medium such as a universal serial bus (USB) memory, or the like. Alternatively, the image processing program 132 may be downloaded from a server device or the like in a network.

When the program is realized using a versatile computer in this manner, a portion of the functions according to the present embodiment may be realized by importing and processing a necessary software module of software modules provided by the OS 134 in a predetermined order and/or at a predetermined timing. That is, the image processing program 132 according to the present embodiment need not include all the software modules for realizing the functions according to the present embodiment, and necessary functions may be provided in cooperation with the OS.

The image processing program 132 may be provided by being incorporated into a portion of a different program. Also in such a case, the image processing program 132 itself does not include a module included in a different program combined as described above, and processing is executed in cooperation with the different program. In this manner, the image processing program 132 according to the present embodiment may be in a form of being incorporated into a different program.

FIG. 2 illustrates an example in which the defect inspection device 100 is realized using a versatile computer, but examples are not limited thereto. All or some of the functions thereof may be realized using a dedicated circuit (for example, an application specific integrated circuit (ASIC) or a field-programmable gate array (FPGA)). Moreover, an external device connected to a network may play a role in a portion of the processing.

As above, from the viewpoint of a configuration of hardware, the inspection system 1 corresponds to an example of "an image capturing device" in the present disclosure. In addition, the workpiece 4 (inspection target) corresponds to an example of "an object" in the present disclosure. Moreover, the defect inspection device 100 functions as an example of "an inspection module", a portion of "an acquisition unit", "a generation unit", a portion of "a setting unit", and "a control unit" in the present disclosure. In addition, the camera 102 (image sensor) corresponds to an example of a portion of "the acquisition unit" in the present disclosure. The input units such as the keyboard 106 and the mouse 108 correspond to examples of a portion of "the setting unit" in the present disclosure. The display 104 corresponds to an example of a portion of "the control unit" in the present disclosure.

[Functional Configuration]

Figure 3:
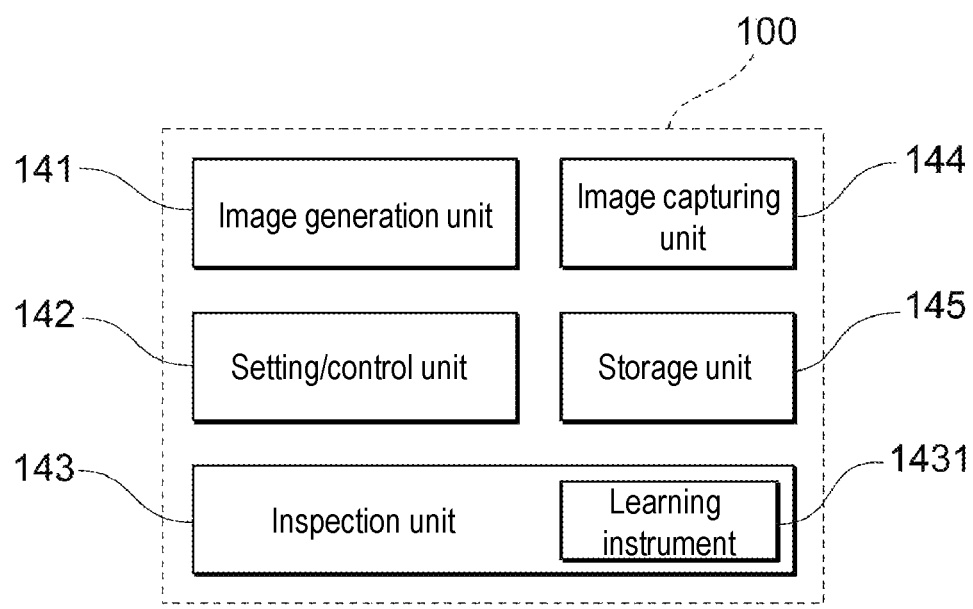
FIG. 3 is a plan view schematically illustrating an example of a functional configuration of the defect inspection device included in the image capture device according to the embodiment of the present disclosure.

Next, using FIG. 3, an example of a functional configuration of the defect inspection device 100 included in the inspection system 1 that is the image capture device according to the embodiment of the present disclosure will be described. FIG. 3 is a plan view schematically illustrating an example of a functional configuration (functioning module) of the defect inspection device 100. As illustrated in FIG. 3, the defect inspection device 100 can include an image generation unit 141, a setting/control unit 142, an inspection unit 143, an image capturing unit 144, and a storage unit 145.

The image generation unit 141, the setting/control unit 142, and the inspection unit 143 in the defect inspection device 100 can be realized by a versatile processor, and the configuration thereof is not limited in the present disclosure. All or some of the functions of these components may be realized using a dedicated circuit (for example, an application specific integrated circuit (ASIC) or a field-programmable gate array (FPGA)). Moreover, an external device connected to a network may play a role in a portion of the processing.

The image generation unit 141 generates the estimated images 140 of the workpiece 4 when illuminating is performed based on variable illumination parameters (differently scheduled illumination parameters) on the basis of the captured images 138 that are input images obtained by the image capturing unit 144 capturing images. That is, the estimated images 140 are not obtained by actually capturing images and are images of the workpiece 4 when images are captured by imitating the illumination parameters at the time of image capturing and performing illumination based on the imitated illumination parameters obtained through estimation.

The setting/control unit 142 uses the estimated images 140 corresponding to the foregoing variable illumination parameters and corresponding label data of the workpiece 4 for learning performed by the inspection unit 143 using a learning instrument 1431, and optimizes the illumination parameters used when the workpiece 4 is inspected by the inspection unit 143 using the learning instrument 1431 that has finished learning on the basis of a result of comparison between a result of estimation performed by the learning instrument 1431 and the label data of the workpiece 4. In addition, the setting unit 142 sets the maximum number of captured images used when they are optimized. Moreover, based on each of the illumination parameters optimized for each number of images equal to or smaller than the set maximum number of captured images, the setting unit 142 calculates an index representing inspection performance expected when the number of images is captured, and displays a result such that it can be presented to a user.

Here, "label data" represents a to-be-inspected feature of the workpiece 4. The to-be-inspected feature is not particularly limited and need only express a feature of the workpiece 4 to be inspected. Examples thereof include data showing whether the workpiece 4 is an accepted product or an unaccepted product, and data showing an appearance feature (for example, a scratch or a size) of the workpiece 4.

The inspection unit 143 includes the foregoing learning instrument 1431 and can inspect the workpiece 4 on the belt conveyor 2 using a trained machine learning model as described above. In addition, the inspection unit 143 outputs a final inspection result relating to the workpiece 4. For example, when the learning instrument 1431 is a convolutional neural network (CNN) generating a feature extracted from images, the inspection unit 143 can include a decision device generating a final inspection result by applying a decision criterion to the feature extracted by the learning instrument 1431, for example.

The image capturing unit 144 captures images of the workpiece 4 using the image sensor. For example, the image sensor can be one or a plurality of image capture devices having variable image capturing parameters such as an aperture size and a shutter speed. The defect inspection device 100 may not include the image capturing unit 144 and can also receive captured images of the workpiece 4 from outside (an external device), in place of the image capturing unit 144.

The storage unit 145 stores a program or data necessary for operation of the defect inspection device 100 and is realized by the storage 130 described above, for example. The defect inspection device 100 may not include the storage unit 145, and a storage outside (of an external device) may be used in place of the storage unit 145.

As above, from the viewpoint of the functioning module, the image capturing unit 144 of the defect inspection device 100 corresponds to an example of "the acquisition unit" in the present disclosure. The image generation unit 141 corresponds to an example of "the generation unit" in the present disclosure. The setting/control unit 142 corresponds to an example of "the setting unit" and "the control unit" in the present disclosure.

§ 3 EXAMPLE OF OPERATION

Figure 4A:
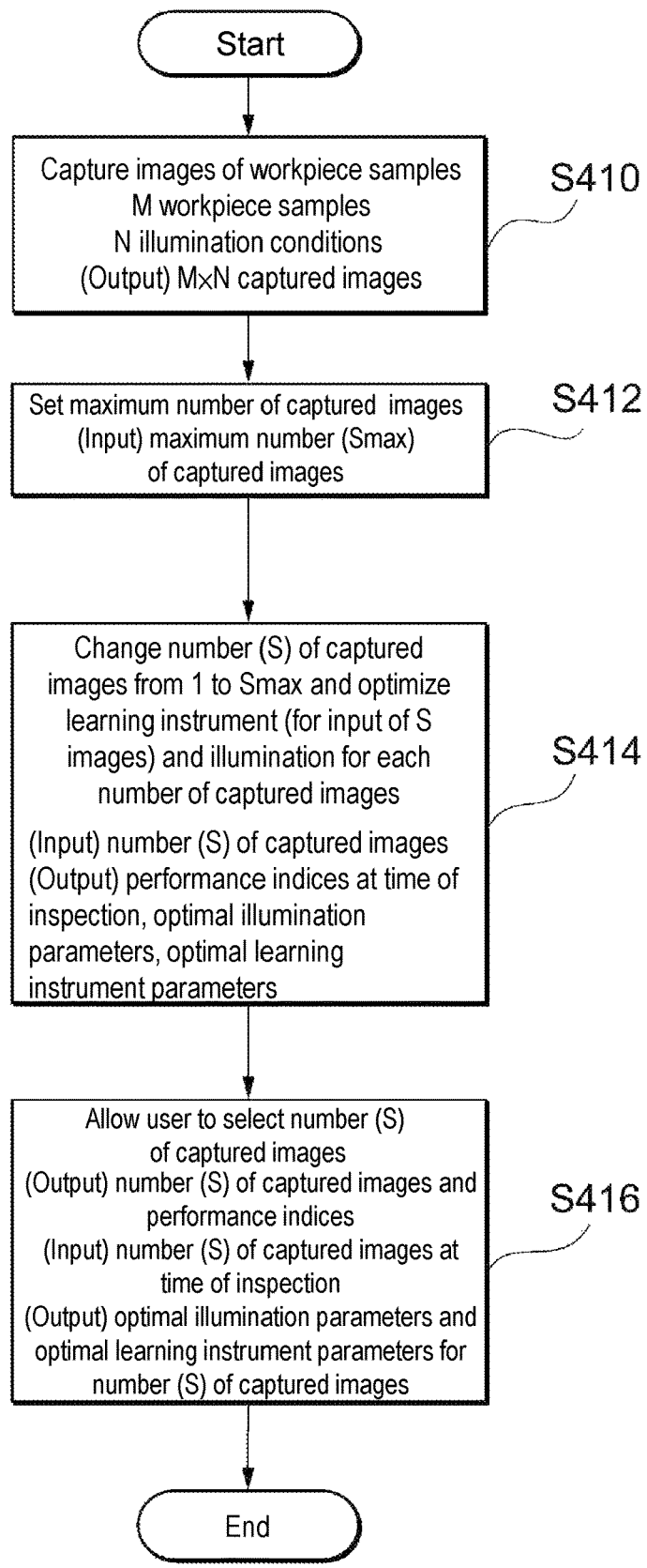
FIG. 4A is a flowchart illustrating an example of a processing procedure in the image capture device according to the embodiment of the present disclosure and is a flowchart illustrating a processing procedure in a learning stage using a machine learning model in an illumination condition setting method.
Figure 4B:
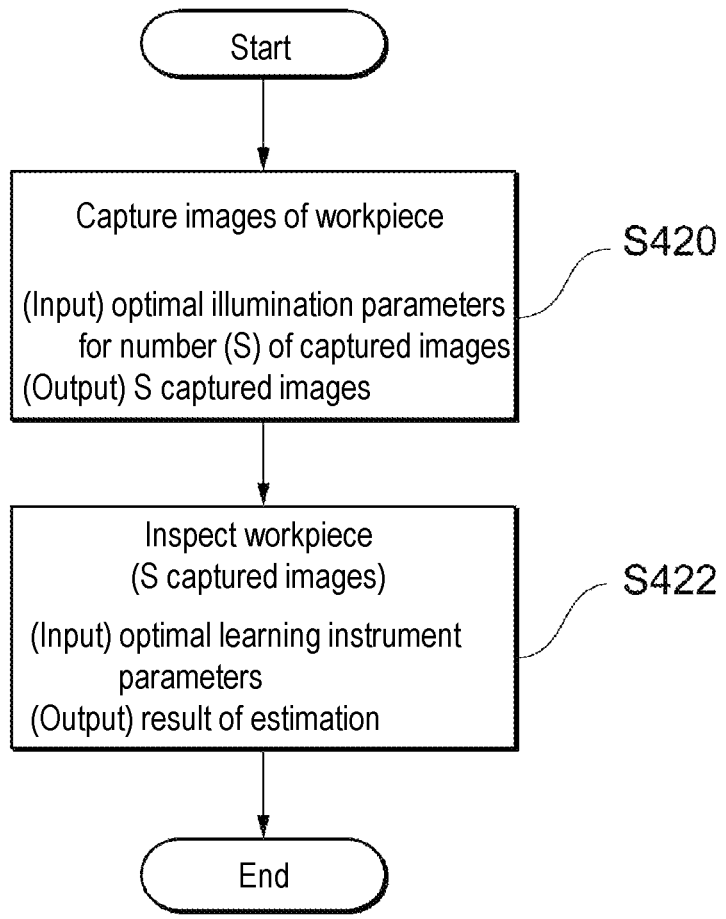
FIG. 4B is a flowchart illustrating another example of a processing procedure in the image capture device according to the embodiment of the present disclosure and is a flowchart illustrating a processing procedure in an inspection stage using the machine learning model in the illumination condition setting method.

Hereinafter, with reference to FIGS. 4A and 4B, an illumination condition setting method according to the embodiment of the present disclosure will be described. FIGS. 4A and 4B are respectively flowcharts illustrating processing procedures of the learning stage and the inspection stage using the machine learning model in the illumination condition setting method according to the embodiment of the present disclosure. The processing procedure described below is merely an example, and each step of the processing may be changed as much as possible within the scope of the technical idea of the present disclosure. In addition, in the processing procedure described below, steps can be suitably omitted, replaced, and added in accordance with the embodiment or an example of each configuration.

(Step S410)

In the learning stage, first, as illustrated in FIG. 4A, in Step S410, the image capturing unit 144 captures an image of the workpiece 4. When illumination is performed based on different illumination parameters, a plurality of captured images relating to the workpiece 4 can be obtained by capturing an image of the workpiece 4 a plurality of times. Each of the captured images corresponds to the illumination parameters of one set. For example, the illumination parameters of each set can include parameters such as a light source to be turned on or a brightness of a turned-on light source. Here, for example, image capturing is performed based on illumination parameters of N kinds with respect to samples of M workpieces 4, and M×N captured images are acquired and output. The quantity of M×N may be a value larger than a maximum number Smax of captured images which will be described below.

(Step S412)

In Step S412, the maximum number Smax of captured images permitted for image capturing of the workpiece 4 when inspecting the workpiece 4 is set. A setting method is not particularly limited. For example, a user may input a desired number of images (direct designation by a user) with respect to the input interface 116. The setting/control unit 142 of the defect inspection device 100 may set a suitable number of images at any time (preset by the inspection system) on the basis of inspection results in the past with respect to a workpiece of the same kind as the workpiece 4 or from a relationship with respect to the takt. The maximum number Smax of captured images may be set as the maximum number of shots achieving the upper limit for the designated detection performance. The maximum number Smax of captured images may be set as the minimum number of shots achieving the lower limit for the designated detection performance.

(Step S414)

In Step S414, learning is performed using estimated images acquired by the learning instrument 1431 from the captured images. Since each of the estimated images has associated illumination parameters, optimized illumination parameters and inspection algorithm parameters as optimized learning instrument parameters can be obtained by optimizing an evaluation function through the learning, that is, the percentage of correct answers (for example, a defect detection rate) of inspection results output from the inspection unit 143 is optimized by selecting optimal illumination parameters and inspection algorithm parameters. Here, optimizing is performed in each case in which images are captured while varying the number of captured images from 1 up to the maximum number Smax of captured images (for the number S of shots=1, 2, and so on to Smax−1, and Smax as the number of captured images; however, an increment in S is not limited to 1), and optimal illumination parameters and optimal inspection algorithm parameters are output. "The illumination parameters" indicate illumination parameters used when a workpiece is inspected by the inspection unit 143, and "the inspection algorithm parameters" indicate parameters of an inspection algorithm used when a workpiece is inspected by the inspection unit 143.

Moreover, in Step S414, an index relating to performance (for example, the defect detection rate or the percentage of correct answers in detection of a defect) when the workpiece 4 is inspected based on the illumination parameters and the inspection algorithm parameters which have been optimized and selected for the number S of shots equal to or smaller than the maximum number Smax of captured images permitted for the workpiece 4 is calculated and output.

(Step S416)

Further, in Step S416, the index relating to performance (for example, the defect detection rate or the percentage of correct answers in detection of a defect) when the workpiece 4 is inspected based on the illumination parameters and the inspection algorithm parameters which have been optimized for the number S of shots equal to or smaller than the maximum number Smax of captured images with respect to the workpiece 4 is displayed by the display 104 via the display interface 118. In addition, at the same time, an input screen is displayed such that a user can input the desired number S of captured images in actual inspection of the workpiece 4. This Step S416 may be performed every time before Step S420 in the inspection stage which will be described below, for example, instead of being performed herein.

(Steps S420 and S422)

Thereafter, in the inspection stage, as illustrated in FIG. 4B, in Step S420, illumination and image capture are performed on the workpiece 4 based on the optimized illumination parameters acquired in Step S414 for the number S of captured images designated in Step S416, and S captured images are acquired. Further, in Step S422, the learning instrument 1431 inspects a defect of the workpiece 4 using the captured images and outputs a result of estimation thereof.

Figure 4C:
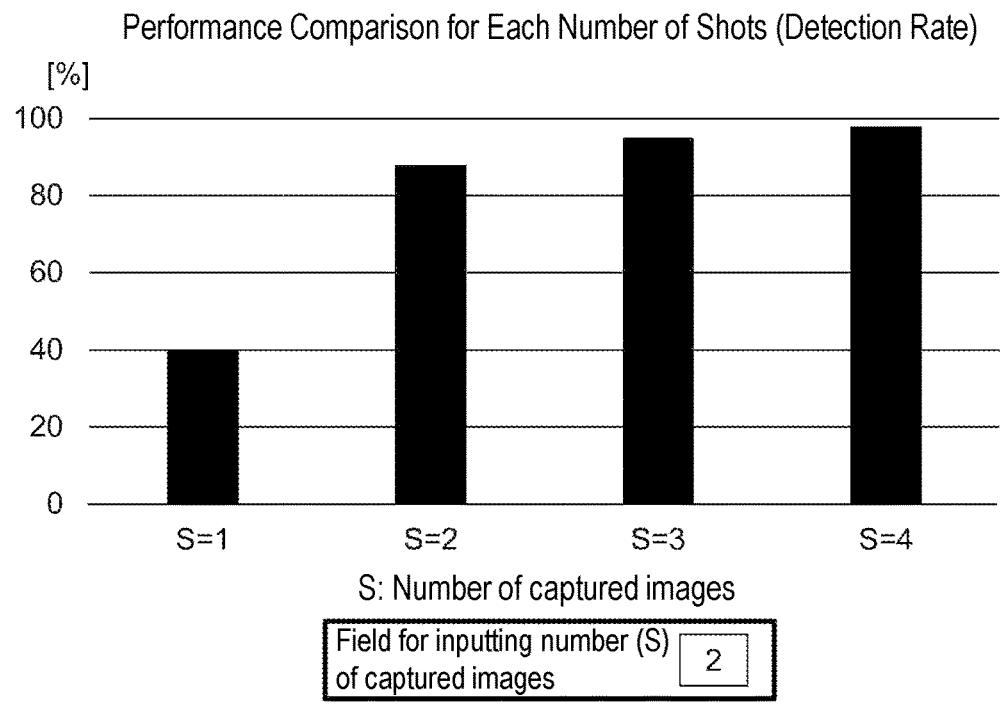
FIG. 4C is a plan view illustrating an example of change in inspection performance with respect to the number of captured images (the number of shots) of an object and an input screen for a user inputting the number of captured images in the image capture device according to the embodiment of the present disclosure.
Figure 4D:
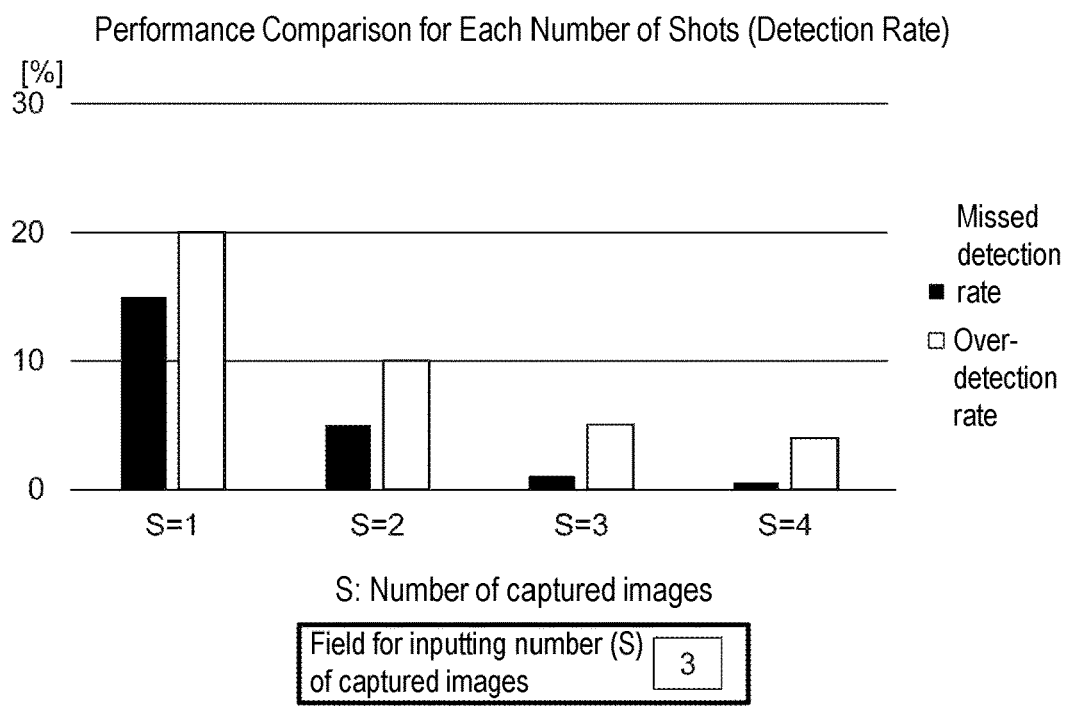
FIG. 4D is a plan view illustrating another example of change in inspection performance with respect to the number of captured images (the number of shots) of an object and an input screen for a user inputting the number of captured images in the image capture device according to the embodiment of the present disclosure.

Here, FIGS. 4C and 4D are plan views illustrating examples of change in inspection performance with respect to the number of captured images (the number of shots) of the workpiece 4 and input screens for the number S of captured images by a user and are examples of display in Step S416. FIG. 4C is an example in which the defect detection rate is used as inspection performance. For example, it is clear from the graph that the defect detection rate exceeds 80% and becomes stable when the number S of shots is 2 or larger, and a user can input "2", for example, for the number of shots at the time of actual inspection of the workpiece 4 on the basis of the graph. In addition, FIG. 4D is an example in which a missed detection rate (a rate that may be erroneously judged to have no defect) and an over-detection rate (a rate that may be erroneously judged to have a defect) for a defect are used as inspection performance. For example, it is clear from the graph that both the missed detection rate and the over-detection rate for a defect fall below 5% and become stable when the number S of shots is 3 or larger, and a user can input "3", for example, for the number of shots at the time of actual inspection of the workpiece 4 on the basis of the graph.

(Step S422)

Figure 5:
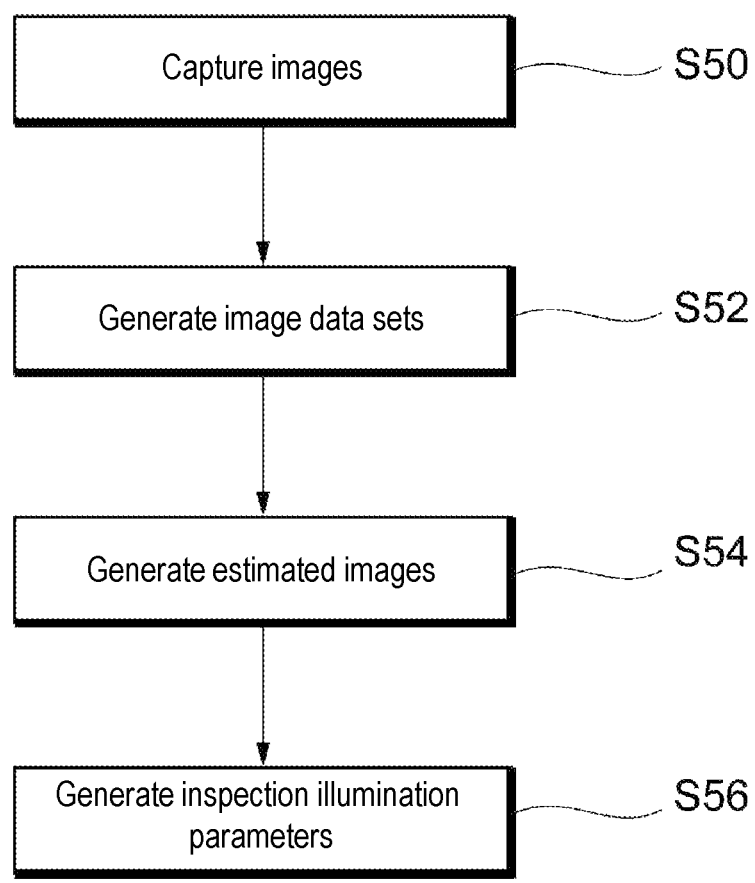
FIG. 5 is a flowchart illustrating an example of the illumination condition setting method in the image capture device according to the embodiment of the present disclosure.

Hereinafter, each step of the illumination condition setting method according to the embodiment of the present disclosure will be described in detail with reference to FIGS. 5 to 7. FIG. 5 is a flowchart more specifically illustrating the illumination condition setting method illustrated in FIG. 4A. (*a*) of FIG. 6A and (*a*) of FIG. 6B are views of detailed processes of Step S54 in FIG. 5, (*b*) of FIG. 6A and (*b*) of FIG. 6B are views of detailed processes of Step S56 in FIG. 5, and (*c*) of FIG. 6B is a view illustrating an inspection stage corresponding to FIG. 4B. FIG. 7 is a plan view schematically illustrating a process of the illumination condition setting method illustrated in FIG. 5. For the sake of convenience of description, a concept of "an illumination simulator" will be introduced hereinafter.

In the present disclosure, the inspection algorithm is conducted by the learning instrument 1431. An evaluation criterion for training of the learning instrument 1431 is generally referred to as a loss value. In the case of a quality decision problem, the percentage of correct answers for PASS/FAIL is expressed by cross entropy or the like. If the content of inspection is a regression problem such as measuring the length of the workpiece 4, distribution of occurrence of an error is modeled in a multidimensional normal distribution or the like, and a log-likelihood function thereof is used as the loss value.

Generally, in learning of the inspection algorithm in machine learning, many pieces of teacher data (PASS/FAIL in the case of decision problem, and a correct answer value in the case of a regression problem) and learning sample images are input in advance, and the parameters are optimized such that the loss value, which is a criterion for checking whether each of the inputs is correctly estimated, is minimized.

Hereafter, illumination in multi-shot image capturing inspection and a procedure of optimizing parameters for the inspection algorithm will be specifically described. First, the definition of the inspection algorithm will be described, and then "an illumination simulator" necessary to enable optimization of illumination will be introduced.

Figure 15:
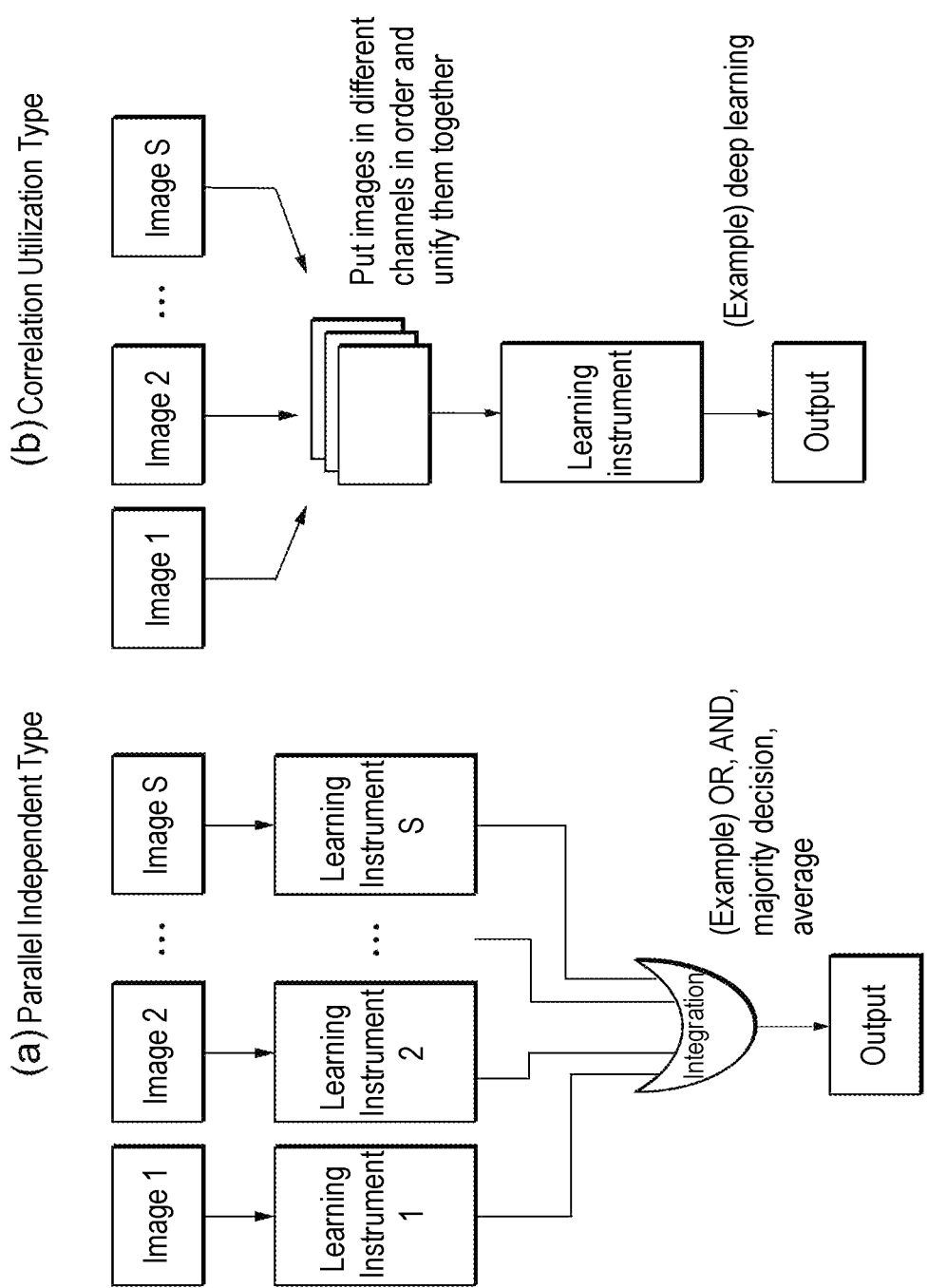
In FIG. 15, (a) and (b) are schematic explanatory views for an algorithm obtaining inspection results from images captured under a plurality of image capturing conditions in the image capture device according to the embodiment of the present disclosure.

Generally, algorithms for obtaining inspection results from images captured (multi-shot image capturing) under a plurality of image capturing conditions are broadly divided into a parallel independent type (A) and a correlation utilization type (B) (refer to (*a*) and (*b*) of FIG. 15). The parallel independent type (A) indicates a type in which the input sequence of captured images is irrelevant (images may not be input under set image capturing conditions in a set order), and a difference in illumination is used simply for the purpose of increasing variation in the appearance of the workpiece 4. On the other hand, the correlation utilization type (B) indicates a type in which the input sequence of captured images is relevant (images are input under set image capturing conditions in a set order), and changes in images due to a difference in illumination are integrated and utilized as correlation information.

When images are captured S times while changing the image capturing conditions for each shot, an illumination image capturing parameter vector in which the illumination parameters (for example, an aggregation of parameters such as an intensity, a position, and an incident angle) at this time are unified can be expressed as follows.

$$\{\theta_L^{(k)}\}_{k=1}^S \quad \text{[Math. 1]}$$

In addition, a vector of an acquired image in each step of image capturing is expressed as follows, and labeling with respect to the workpiece 4 will be referred to as v.

$$\{u_k\}_{k=1}^S \quad \text{[Math. 2]}$$

At this time, a loss function of the inspection algorithm for judging abnormality from the number S of images is expressed as follows.

$$L_S(u_1, u_2, \ldots, u_S, v|\theta_D) \quad \text{[Math. 3]}$$

In the correlation utilization type (B), the order of images of arguments also has a meaning, and it is equivalent to handling these as one huge vector. As a specific example, it is recalled that each of the captured images is input to each channel of the images and a frame work of deep learning is applied or the like. In such a case, the loss function cannot be written down any more specifically.

On the other hand, in the case of the parallel independent type (A), the image capturing conditions are handled in an equivalent manner for each of the arguments and are used with a meaning of increasing the number of independent trials. Therefore, in some cases, on the assumption that the phenomenon observed in each step of image capturing is independent, it is also conceivable to use the loss function as indicated in the following Expression (1).

[Math. 4]

$$L_S(u_1, u_2, \ldots, u_S, v|\theta_D) = \Sigma_{k=1}^S L(u_k, v|\theta_D) \quad (1)$$

A probability distribution of an independent phenomenon is expressed by the product, and when the log-likelihood function thereof is set as the loss function, it becomes the sum. Therefore, expression may be established as in the foregoing expression, but various other forms are considered. For example, OR/AND of estimated (decision) results of each image by the learning instrument or majority decision may be adopted. Even with a configuration of a learning instrument capable of learning correlation as in the case of (B), the learning instrument of the case of (A) can be realized by causing the sequence of input images to be irrelevant to the prescribed image capturing conditions (learning is performed by randomly rearranging and inputting images), or the like.

Here, in order to perform optimizing of illumination as described above, there is a need for captured images when illumination is individually set as desired for a number of learning sample images to be able to be reproduced in a computer. For this reason, in the present disclosure, when the illumination parameter vector is applied, "illumination simulators" for calculating acquired imaged obtained through image capturing with the illumination are introduced. Now, an aggregation of illumination simulators corresponding to an aggregation of samples of the workpieces 4 for learning will be defined as follows. A specific mounting example of the illumination simulator is indicated in "a fifth modification example" which will be described below.

$$\{f_i\}_{i=1}^M \quad \text{[Math. 5]}$$

Further, a relationship expressed by the following Expression (2) is obtained by substituting a captured image $u_k$ in the argument of the loss function of the inspection algorithm in multi-shot image capturing with a simulator image which will be described below. However, an illumination parameter $\theta_L$ in multi-shot image capturing is expressed in a N×S matrix expressed by the following Expression (3).

$$f_i(\theta_L^{(k)}) \quad \text{[Math. 6]}$$

[Math. 7]

$$L_S(u_1, u_2, \ldots, u_S, v_i|\theta_D) = L_S(f_i(\theta_L^{(1)}), f_i(\theta_L^{(2)}), \ldots, f_i(\theta_L^{(S)}), v_i|\theta_D) = L_S(f_i, v_i|\theta_L, \theta_D) \quad (2)$$

$$\theta_L[\theta_L^{(1)}, \theta_L^{(2)}, \ldots, \theta_L^{(S)}] \quad (3)$$

Using this illumination simulator, optimal illumination parameters in multi-shot image capturing for S shots and the inspection algorithm parameters for judging abnormality can be obtained as indicated in the following Expression (4). For example, the detection rate in multi-shot image capturing for S shots is calculated using the illumination parameters and the inspection algorithm parameters obtained in this manner.

[Math. 8]

$$(\hat{\theta}_L, \hat{\theta}_D) = \arg\min_{\theta_L, \theta_D} \sum_{i=1}^M L(f_i, v_i | \theta_L, \theta_D) \quad (4)$$

(Step S50)

Moreover, description will be given along with processing in each step. In Step S50 illustrated in FIG. 5, the image capturing unit 144 captures images of the workpiece 4, and Step S50 can be made similar to Step S410, for example. Regarding a preparation stage for optimizing, captured images (1≤j≤N) for obtaining each of the illumination simulators are captured for all the workpieces 4 (1≤i≤M), and the illumination parameters and the inspection algorithm parameters in image capturing for each of S shots are acquired.

Here, the illumination parameters for each of the light sources are changeable. For example, since the light emitting position and/or the light emitting intensity of each of the light sources is variable, the workpiece 4 can acquire different illumination. In addition, the workpiece 4 has known label data showing the to-be-inspected feature thereof. For example, the label data can be made as data showing whether the workpiece 4 is an accepted product or an unaccepted product and can be made as data showing the appearance feature (for example, a scratch or a size) of the workpiece 4. The content of the label data is not limited, and it need only express the feature as an inspection target of the workpiece 4.

(Step S52)

In Step S52, the image generation unit 141 obtains image data sets by associating the captured images and the corresponding illumination parameters with each other. For example, the image data sets can include corresponding image capturing parameters such as an aperture size, a shutter speed, and the like. For example, the image data sets can be stored in the storage unit 145.

(Step S54)

In Step S54, the image generation unit 141 generates estimated images of each workpiece when illuminating is performed based on the illumination parameters on the basis of the image data sets.

Figure 6A:
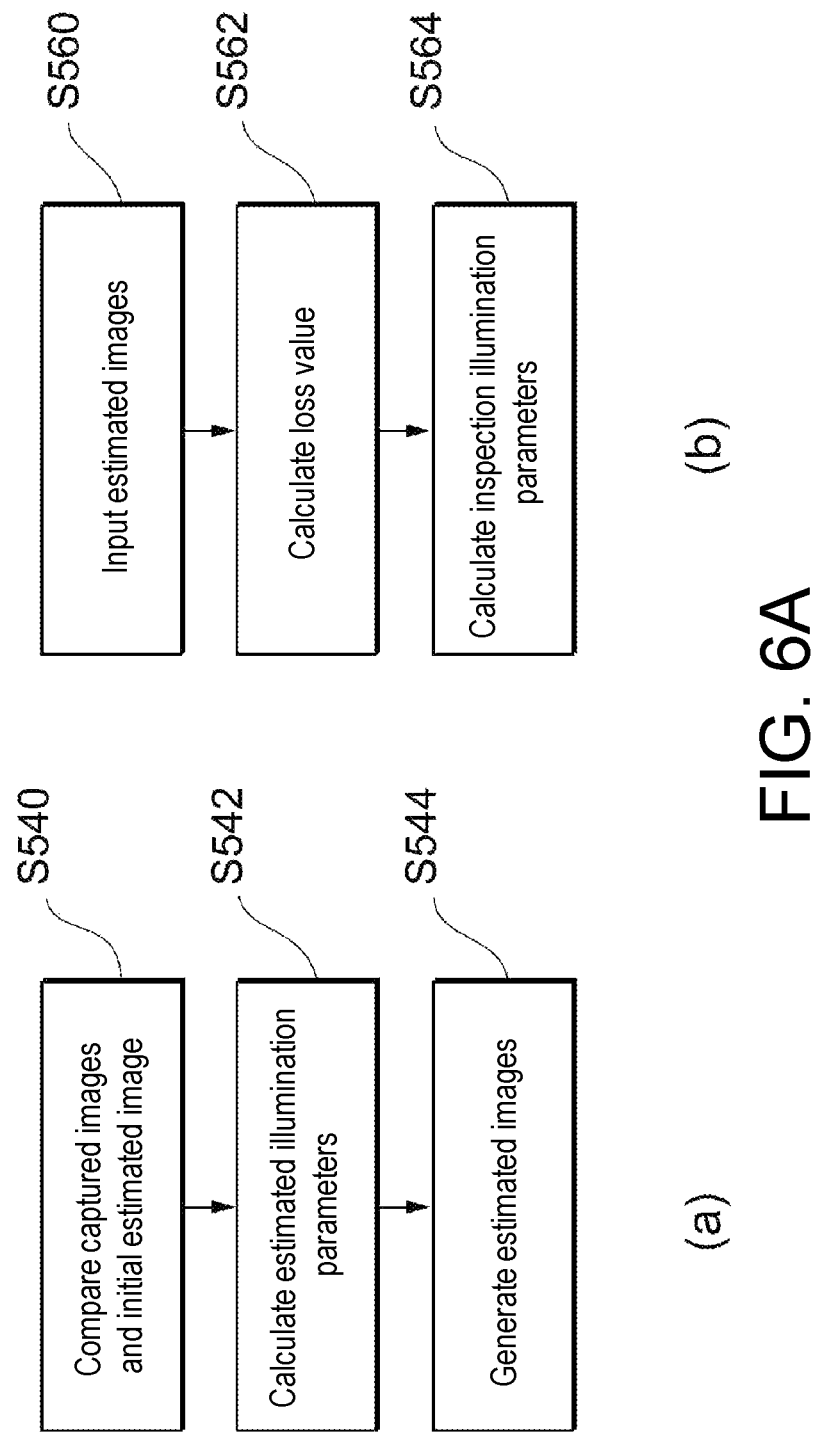
FIG. 6A shows flowcharts illustrating an example of steps in FIG. 5.
Figure 6B:
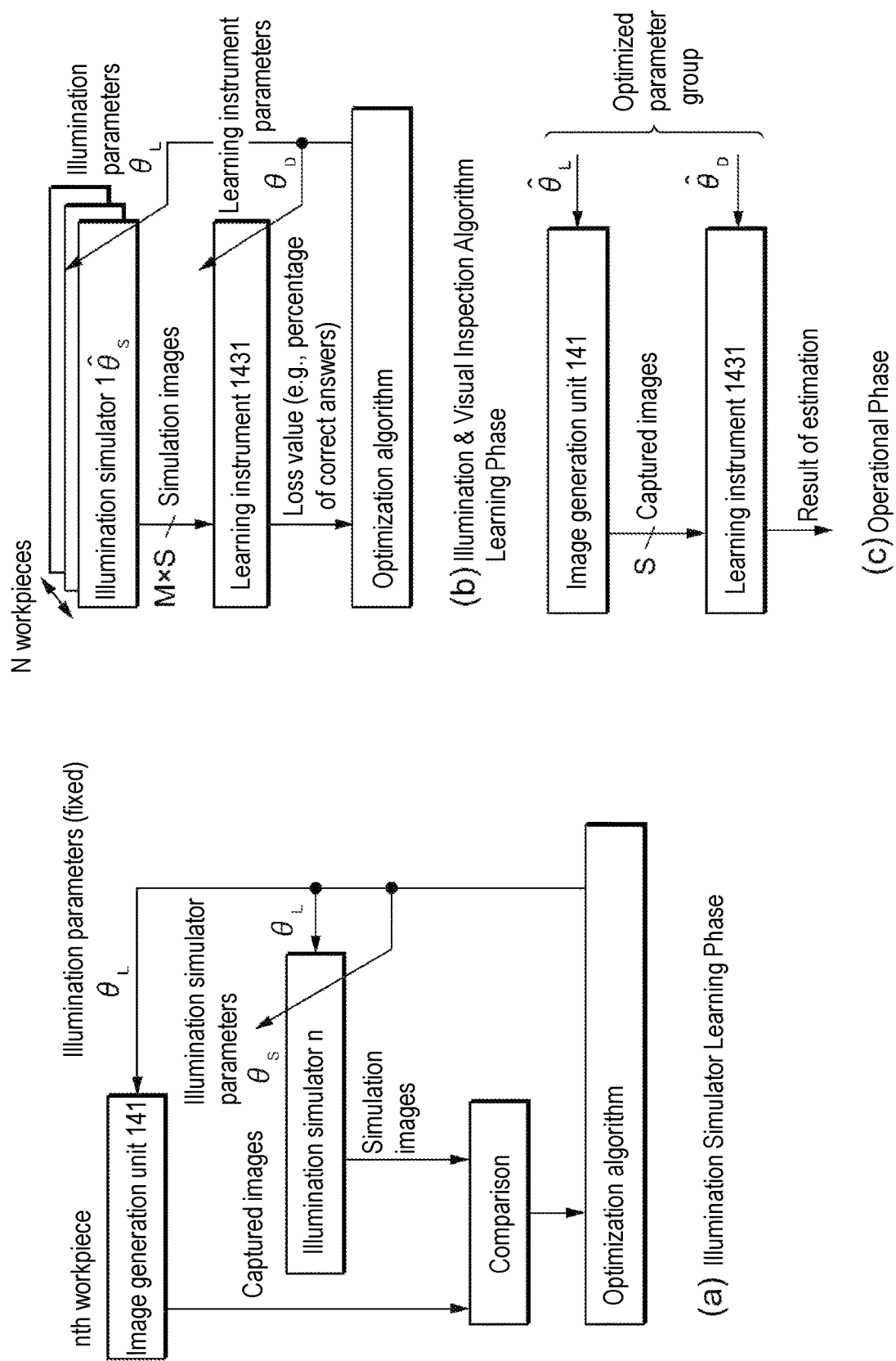
FIG. 6B shows flowcharts illustrating an example of steps in FIG. 5.
Figure 7:
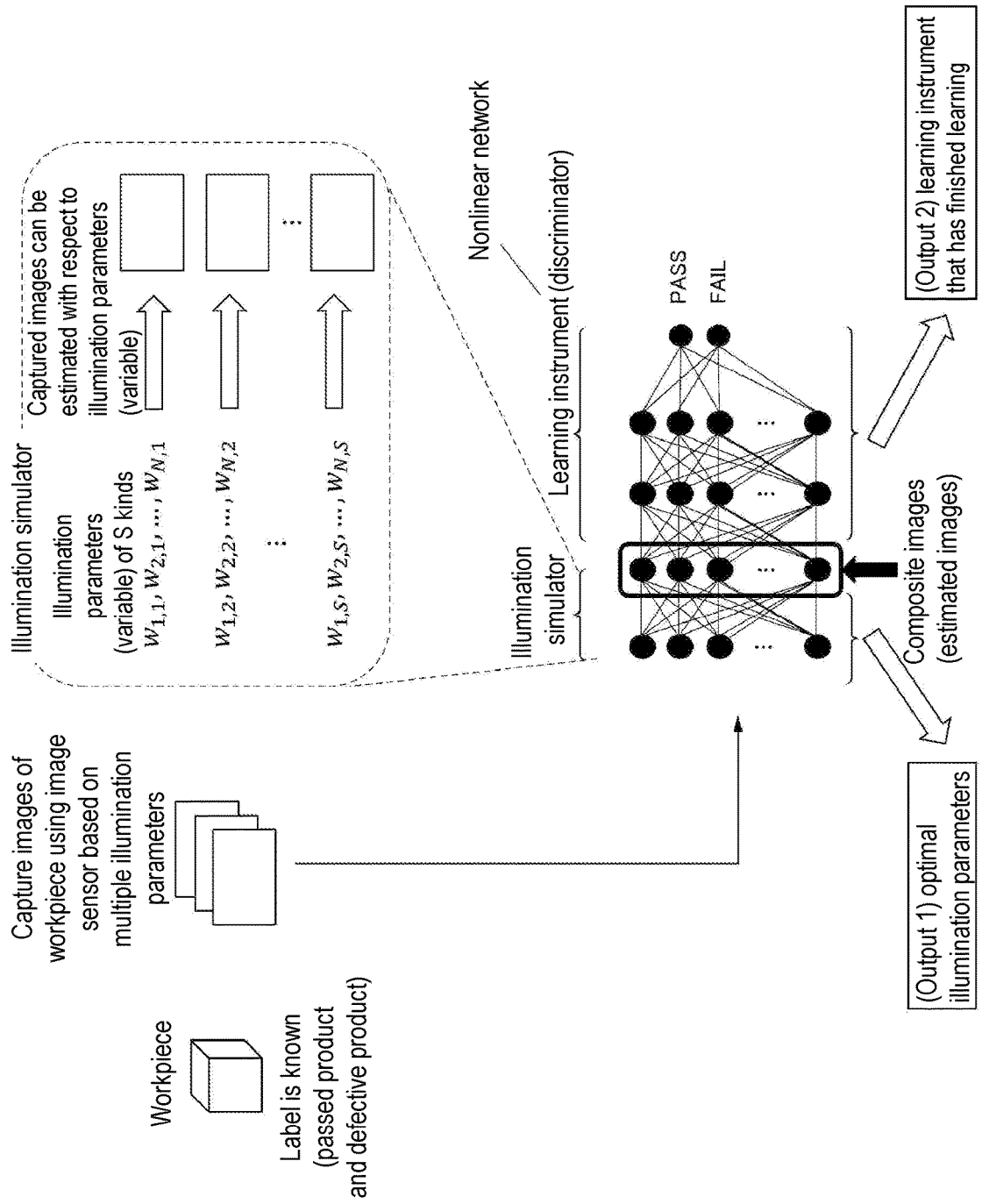
FIG. 7 is a plan view schematically illustrating a process of the illumination condition setting method illustrated in FIG. 5.

Specifically, as illustrated in (a) of FIG. 6A and (a) of FIG. 6B, in Step S540, the illumination simulator of each workpiece 4 generates an initial estimated image on the basis of an initial simulator parameter, and the image generation unit 141 compares the initial estimated image and the captured images of the workpiece 4.

In Step S542, a simulator parameter after optimizing is ultimately obtained by adjusting a simulator parameter $\theta_S$ on the basis of the difference. For example, in the case of a simple illumination simulator of a linear model, the initial simulator parameter is not necessarily required. The simulator parameter differs from the illumination parameter limiting illumination conditions. The optimizing process can be made complete in a method of machine learning. In addition, in Step S544, the estimated images are generated by performing illumination with the illumination simulators based on variable illumination parameters on the basis of the parameter $\theta_S$ of the illumination simulators after optimizing.

(Step S56)

Returning to FIG. 5, in Step S56, the learning instrument 1431 performs learning on the basis of the estimated images and acquires the illumination parameters used when the workpiece 4 is inspected. Specifically, (b) of FIG. 6A and (b) of FIG. 6B can be referred to.

In (b) of FIG. 6A and (b) of FIG. 6B, learning in which the estimated images are input to the learning instrument 1431 is performed in Step S560. In addition, in Step S562, the learning instrument 1431 performs learning using learning data including the estimated images and the corresponding label data of the workpiece 4 and obtains a result of estimation. Moreover, in Step S564, the inspection algorithm parameters of the learning instrument 1431 are optimized, and the result of estimation of the learning instrument 1431 and the label data are matched to each other.

As illustrated in FIG. 7, for example, when the learning instrument 1431 performs deep learning utilizing a neural network, the inspection algorithm parameters and the illumination parameters can be optimized at the same time and a neural network after learning having optimal illumination parameters can be obtained by matching an output of the neural network and the label data to each other. The learning instrument 1431 that has finished learning can improve the percentage of correct answers of detection results of the workpiece 4 by selecting the illumination parameters.

The part indicated by the dashed line frame in FIG. 7 is not necessarily performed. For example, in accordance with a difference in illumination pattern, processing of the part in the dashed line frame may not be performed. At this time, images of the workpiece 4 captured based on various illumination parameters and the label data corresponding to the images can be directly used for machine learning.

§ 4 OPERATION AND EFFECTS

As above, according to an example of the inspection system 1 serving as the image capture device according to the present embodiment and the inspection method serving as the image capture method using the image capture device, optimizing of the illumination parameters used when the workpiece 4 is inspected by the defect inspection device 100 and the inspection algorithm parameters for the machine learning model is performed in a case in which multi-shot image capturing is performed for each number of images equal to or smaller than the maximum number Smax of captured images permitted for the workpiece 4, indices representing inspection performance (for example, a detection rate, a missed detection rate, and an over-detection rate) expected when the each number of images is captured is calculated, and the indices are presented to a user. Thus, a user can check the presented indices and determine a desired number S of captured images while taking a processing time or a processing speed (takt) into account. Therefore, the image capturing conditions can be efficiently optimized without relying on manual adjustment as in the related art. That is, change in inspection performance when the number of captured images (that is, a takt) is changed after decision performance itself of a decision algorithm in machine learning is directly evaluated can be presented to a user in advance. Therefore, when optimizing a balance between achievement of a desired detection rate relating to a defect or the like of the workpiece 4 and the takt, it is possible to be free from trouble such as trial and error relying on human hands.

In addition, in the illumination parameter setting method according to the embodiment of the present disclosure illustrated in FIGS. 5 to 7, by optimizing the inspection illumination parameters and the inspection algorithm parameters at the same time, man-hours for design can be shortened and direct optimization of an evaluation criterion based on only the viewpoint of accuracy of inspection (quality decision or a measurement value) can be realized. Further, it is possible to perform direct optimization for an image capturing/image processing system in its entirety, such as illumination design favorable for an inspection algorithm and an optimal inspection algorithm for the illumination. Moreover, in the foregoing illumination condition setting method, since the illumination simulators are introduced, there is no need to acquire many photographs of a workpiece. Therefore, an image capturing time can be saved, man-hours can be saved, and dependence on human can be reduced. Further, in the illumination parameter setting method, since a plurality of image data sets corresponding to the workpieces 4 of a plurality of kinds can also be prepared, estimated images of a plurality of kinds can be generated on the basis of the plurality of image data sets. Accordingly, generality (versatility) of the inspection unit 143 is enhanced, and there is no need to capture images, set the illumination parameters, or the like for each of the workpieces 4 of various kinds.

§ 5 MODIFICATION EXAMPLE

Hereinabove, the embodiment as an example of the present disclosure has been described in detail. However, the foregoing description merely describes an example of the present disclosure in every respect, and it goes without saying that various improvements or modifications can be performed without departing from the scope of the present disclosure. For example, a change as described below can be made. In the following description, similar reference signs are used regarding constituent elements similar to those in the foregoing embodiment, and description is suitably omitted for points similar to those in the foregoing embodiment. In addition, the foregoing embodiment and each of the following modification examples can be suitably constituted in combination.

Figure 8:
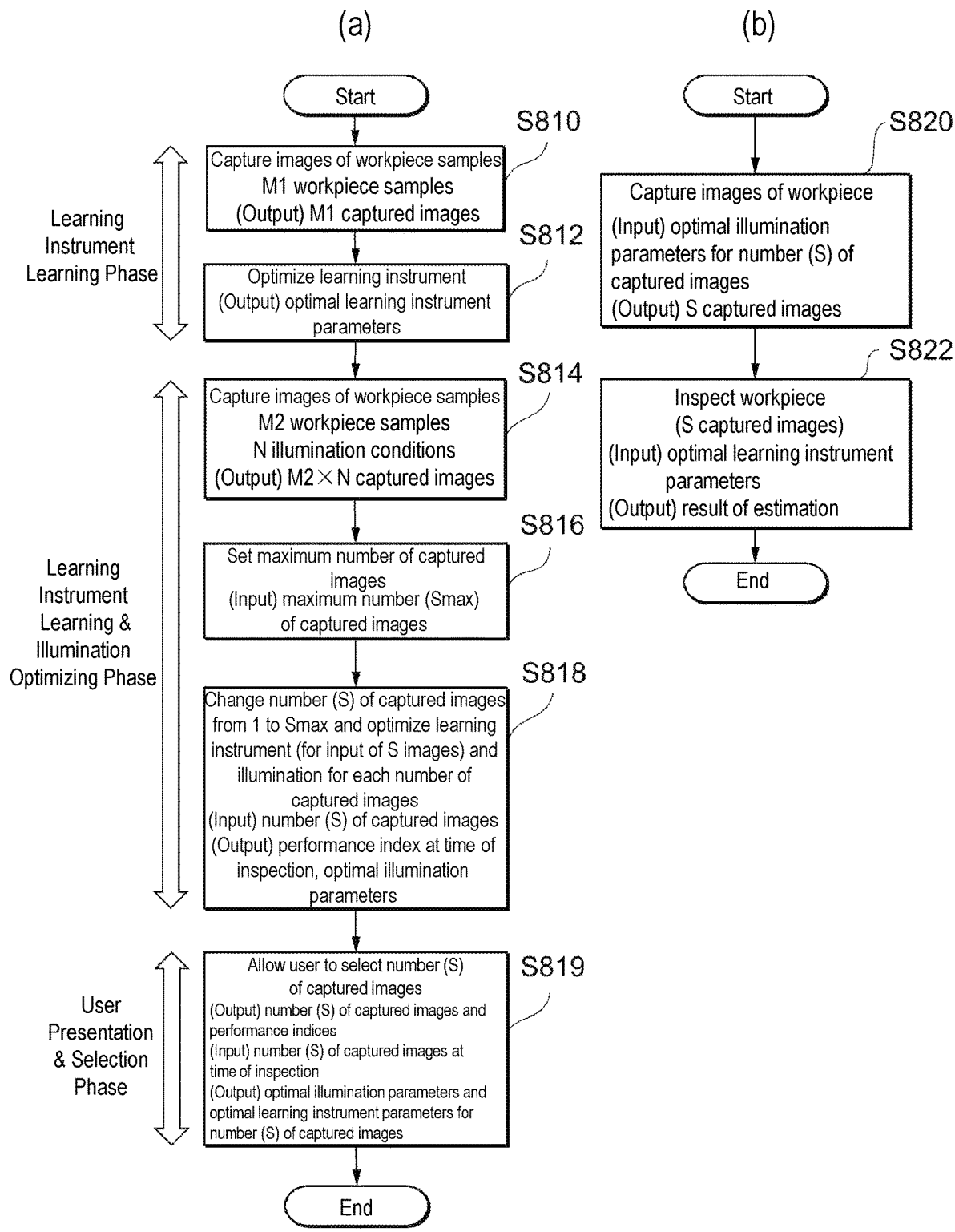
FIG. 8 shows flowcharts illustrating an example of a processing procedure in an image capture device according to another embodiment of the present disclosure, in which (a) and (b) are respectively flowcharts illustrating the learning stage and the inspection stage using the machine learning model in the illumination condition setting method.

5.1: First Modification Example (a) and (b) of FIG. 8 are respectively flowcharts illustrating the learning stage and the inspection stage using the machine learning model in the illumination condition setting method according to another embodiment of the present disclosure. Hereinafter, first, the principle of the method will be described.

Generally, in learning of the inspection algorithm in machine learning, many training images are required. This particularly becomes an outstanding problem with respect to a technique such as deep learning having many parameters. Here, the problem is that the technique described above is required to acquire a large number (as many as M×N) of images. When the value of M is extremely large, there is a problem that it is extremely difficult to realize the technique.

As a solution therefor, in only the inspection algorithm requiring many training images, parameters are obtained in advance using training images under fixed image capturing conditions. That is, instead of obtaining an optimum solution by assigning $\theta_L$ and $\theta_D$ at the same time, $\theta_L$ is obtained using an illumination simulator for a small number of workpiece samples after $\theta_D$ is obtained. Generally, this may be a valid method because it is considered that there are a small number of illumination parameters.

Specifically, as in the following Expressions (5) and (6), two kinds of data sets ($D_1$ and $D_2$) are prepared.

[Math. 9]

$$D_1 = \{(u_i, v_i)\}_{i=1}^{M1} \quad (5)$$

$$D_2 = \{(f_i, v_i)\}_{i=1}^{M2} \quad (6)$$

Further, as expressed in the following Expressions (7) and (8), optimizing is performed in two stages, and optimal illumination parameters are obtained.

[Math. 10]

$$\hat{\theta}_D = \underset{\theta_D}{\text{argmin}} \sum_{(u,v) \in D_1} L(u, v | \theta_D) \quad (7)$$

$$\hat{\theta}_L = \underset{\theta_L}{\text{argmin}} \sum_{(f,v) \in D_2} L(f, v | \theta_L, \hat{\theta}_D) \quad (8)$$

As above, due to setting of $M_1 > M_2$, the number of captured images necessary for learning can be reduced from M×N to $M_1 + M_2 \times N$. In the foregoing technique, only the illumination parameters may be obtained while using existing fixed parameters for the inspection algorithm parameters.

(Steps S810 to S814)

With reference to FIG. 8, a process of the method will be described in detail. As illustrated in (a) of FIG. 8, in Step S810, M1 captured images are obtained by capturing images of M1 workpieces based on the fixed illumination parameters. In Step S812, the learning instrument 1431 performs learning using the M1 captured images, and the inspection algorithm parameters are optimized. In Step S814, based on illumination parameters of N kinds, M2×N captured images are obtained by capturing image of M2 workpieces of M1 workpieces.

(Steps S816 to S819)

In Step S816, the maximum number Smax of captured images permitted in capturing images of the workpiece 4 when inspecting the workpiece 4 is set. Further, in Step S818, on the basis of image data sets obtained by associating M2×N captured images with the illumination parameters corresponding to these captured images, the estimated images of the workpiece 4 at the time of illumination based on the illumination parameters are generated. By applying these estimated images to the learning instrument 1431 that has finished learning, the illumination conditions used when the workpiece 4 is inspected by the inspection unit 143 are set on the basis of a result of comparison between a result of estimation performed with the learning instrument 1431 and the label data. Regarding a variation for comparison, for example, after images of the workpiece based on N illumination parameters are input to the learning instrument 1431 that has finished learning as test images, the illumination parameter having the highest percentage of correct answers in the result of estimation performed by the learning instrument 1431 is selected and adopted as the illumination parameter used when the workpiece 4 is inspected. Here, optimizing is performed in each case in which images are captured while varying the number of captured images from 1 up to the maximum number Smax of captured images (for the number S of shots=1, 2, and so on to Smax−1, and Smax as the number of captured images; however, an increment in S is not limited to 1), and optimal illumination parameters are output.

Further, in Step S819, the index relating to performance (for example, the defect detection rate or the percentage of correct answers in detection of a defect) when the workpiece 4 is inspected based on the illumination parameters and the inspection algorithm parameters which have been optimized for the number S of shots equal to or smaller than the maximum number Smax of captured images with respect to the workpiece 4 is displayed by the display 104 via the display interface 118. In addition, at the same time, an input screen is displayed such that a user can input the desired number S of captured images in actual inspection of the workpiece 4. This Step S819 may be performed every time before Step S820 in the inspection stage which will be described below, for example, instead of being performed herein.

(Step S820)

Through the learning stage illustrated in (a) of FIG. 8, as illustrated in (b) of FIG. 8, in Step S820, captured images are obtained by capturing images of the workpiece 4 based on the inspection illumination parameters by the number S of captured images designated in Step S819. Further, in Step S822, the learning instrument 1431 inspects a defect of the workpiece 4 using the captured images and outputs a result of estimation thereof.

According to the inspection method which has been described with reference to FIG. 8, a computation amount of the system at the time of learning using a machine learning model can be reduced, a load on the system can be reduced, and an operation of setting the illumination parameters can be simplified. Further, in the foregoing method, since the number of captured images necessary for learning can be reduced, man-hours can be reduced, and a program for optimizing the parameters can be simplified. A learning instrument learning phase, a learning instrument learning/illumination optimizing phase, and a user presentation and selection phase are not necessarily performed at the same time as long as they go in order. In addition, an existing instrument may be utilized as the learning instrument. In such a case, the learning instrument learning phase is not present.

5.2: Second Modification Example

Figure 9:
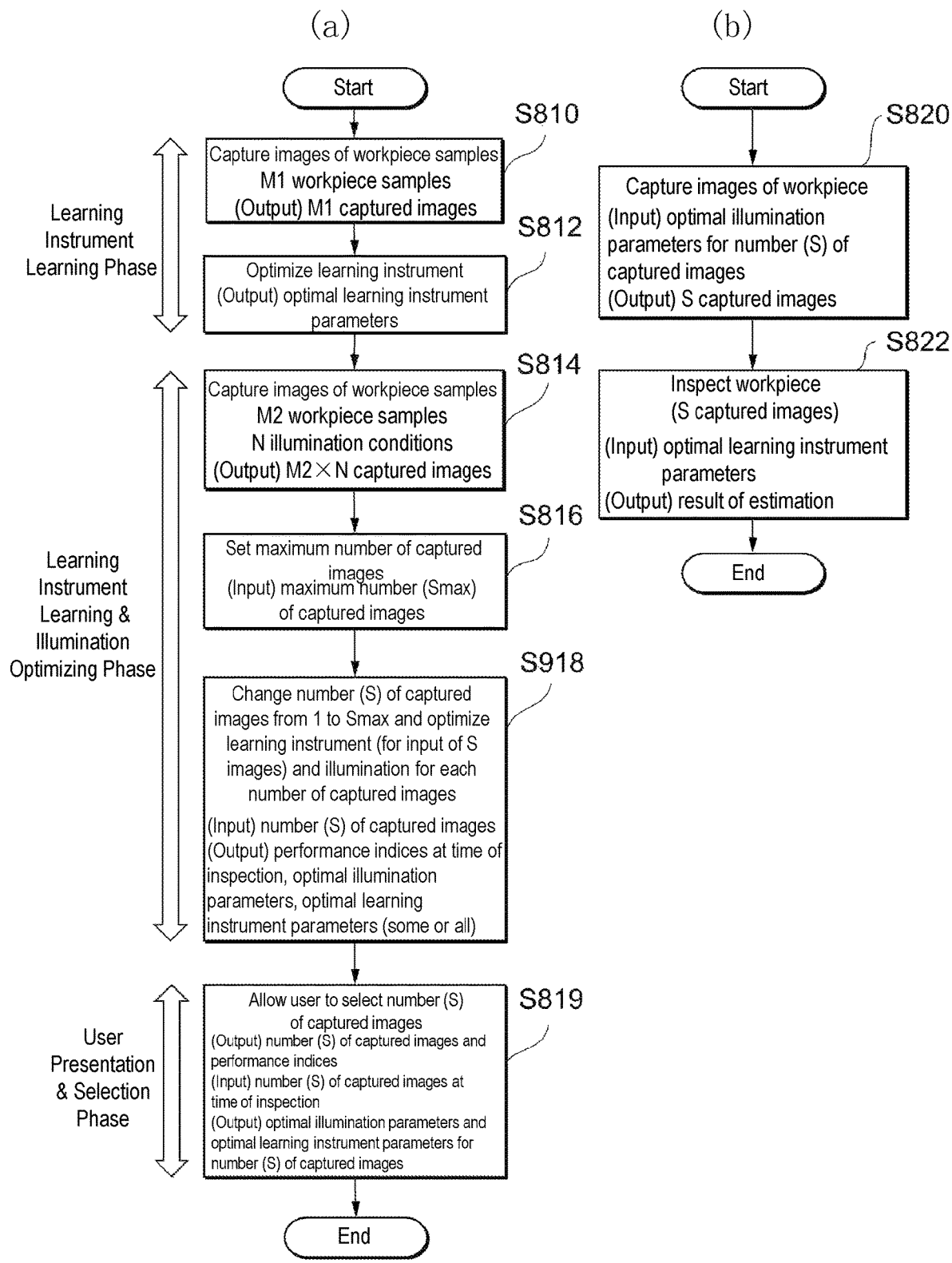
FIG. 9 shows flowcharts illustrating another example of a processing procedure in the image capture device according to another embodiment of the present disclosure, in which (a) and (b) are respectively flowcharts illustrating the learning stage and the inspection stage using the machine learning model in a variation of the illumination condition setting method.

The illumination condition setting method which has been described with reference to FIG. 8 can be variously modified. Hereinafter, variation thereof will be described in detail in association with FIG. 9. (a) and (b) of FIG. 9 are respectively flowcharts illustrating the learning stage and the inspection stage using the machine learning model in a variation of the illumination condition setting method in FIG. 8. In FIG. 9, reference signs which are the same or similar are marked for steps which are the same as or similar to those in FIG. 8, and description thereof is omitted.

In learning in Step S918, except for $\theta_L$, a portion (which will be marked as $\theta'_D$) of the parameters of the inspection algorithm are also set as a variable value, and the parameters are adjusted again as in the following Expressions (9) and (10). Accordingly, learning of a second stage can be executed by simply using an illumination simulator for a small number of workpiece samples. On the other hand, it is possible to partially resolve a disadvantage that a learning instrument optimized for illuminating cannot be constituted.

[Math. 11]

$$\hat{\theta}_D = \underset{\theta_D}{\operatorname{argmin}} \sum_{(u,v) \in D_1} L(u, v \mid \theta_D) \quad (9)$$

$$(\hat{\theta}_L, \hat{\theta}_D) = \underset{\theta_L, \theta_D}{\operatorname{arg\,min}} \sum_{(f,v) \in D_2} L(f, v \mid \theta_L, \hat{\theta}_D) \quad (10)$$

Similarly, the number of captured images necessary for learning can be reduced, and thus it is possible to constitute a learning instrument optimized for illuminating (to a certain degree). In addition, in the foregoing inspection method which has been described with reference to FIG. 9, in learning in Step S918, all the inspection algorithms may be readjusted. In this case, learning in Step S812 operates as pre-training. The learning instrument learning phase and the illumination optimizing phase are not necessarily performed at the same time as long as they go in order. In addition, an existing instrument may be utilized as the learning instrument. In this case, the learning instrument learning phase is not present.

5.3: Third Modification Example

Figure 10:
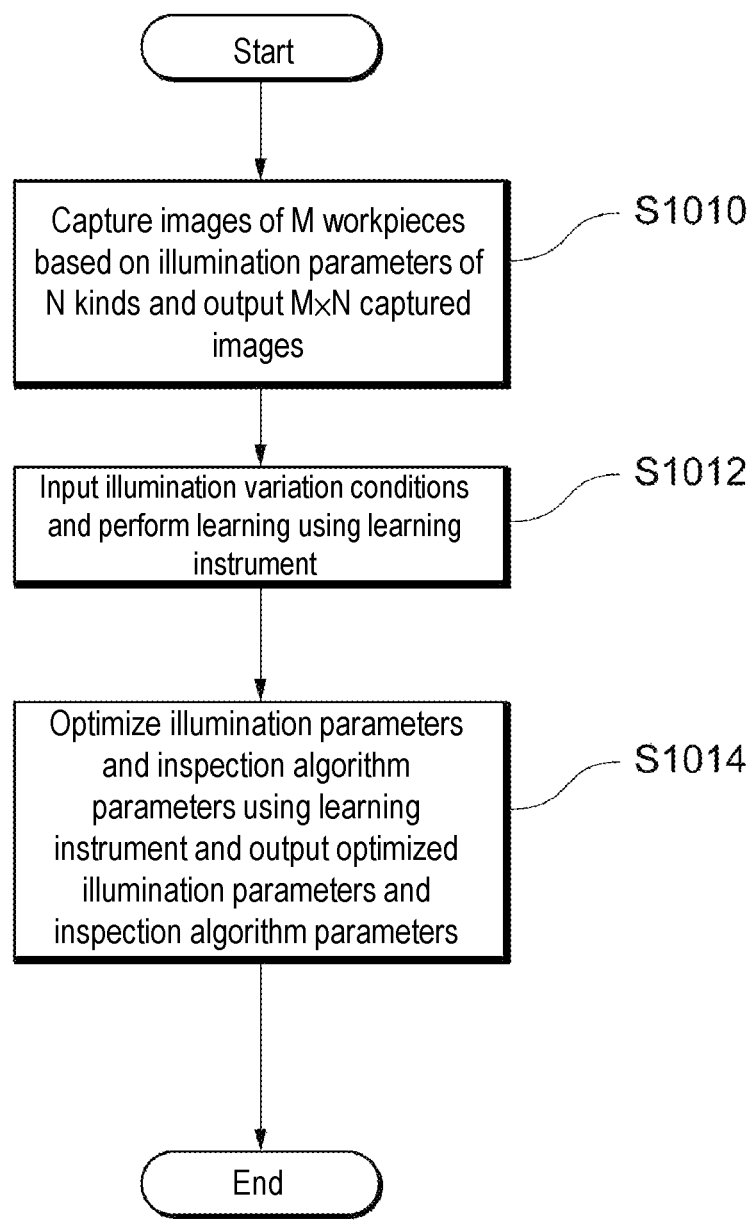
FIG. 10 is a flowchart illustrating the illumination condition setting method in an example of the processing procedure in the image capture device according to another embodiment of the present disclosure.

FIG. 10 is a flowchart illustrating the illumination condition setting method in an example of the processing procedure in the image capture device according to another embodiment of the present disclosure. On the basis of the inspection method which has been described with reference to FIG. 8, robustness can be applied to a minute change of an illuminating/image capturing system.

When it is intended to perform similar inspection in parallel on a line, it is difficult to make completely the same copy of an image capturing system including illuminations, and thus an individual difference generally occurs due to unevenness of attachment positions of cameras or illuminations, and the like.

When optimal illumination parameters obtained by the technique of the present disclosure are used in a copied environment differing from the environment in which images are captured, performance may be significantly impaired due to the individual difference between the image capturing systems. In order to prevent this, an evaluation function obtained by adding noise to the illumination parameters and averaging the results thereof is used, and thus a parameter robust against minute change in environment can be obtained. Specifically, as in the following Expression (11), the illumination parameters or parameters for the inspection algorithm are obtained by substituting the loss function L described above with $L_\varepsilon$ which will be defined below.

[Math. 12]

$$L_\varepsilon(f_i, v_i \mid \theta_L, \theta_D) = \underset{\varepsilon}{\mathbb{E}} L(f_i, v_i \mid \theta_L + \varepsilon, \theta_D) \quad (11)$$

Here, $\varepsilon$ is a noise vector following an arbitrary distribution. Generally, a multidimensional normal distribution with zero center, a uniform distribution within a range, or the like is used. This is an application of a concept of augmentation of an input image in deep learning as it stands to the illumination parameters.

Here, a process of the method will be described in detail with reference to FIG. 10. As illustrated in FIG. 10, in Step S100, captured images are obtained by capturing images of the workpiece 4. The step can be referred to Steps S410, S50, and S810. In Step S102, in addition to inputting estimated images acquired from the captured images to the learning instrument 1431, illumination variation conditions are input, and learning is performed. "Illumination variation conditions" said herein can include the minute change in environment described above and can also include minute change in the light source and the image sensor. In Step S104, the loss function of the learning instrument 1431 is minimized with respect to the average loss value of the illumination parameters within a predetermined range, and optimized illumination parameters are obtained. Here, the illumination parameters are variables of the loss function.

In the inspection method which has been described with reference to FIG. 10, since influence of the environment is taken into account, robustness against minute change in illumination parameters is improved, and performance of the inspection system in its entirety is improved.

5.4: Fourth Modification Example

Figure 11:
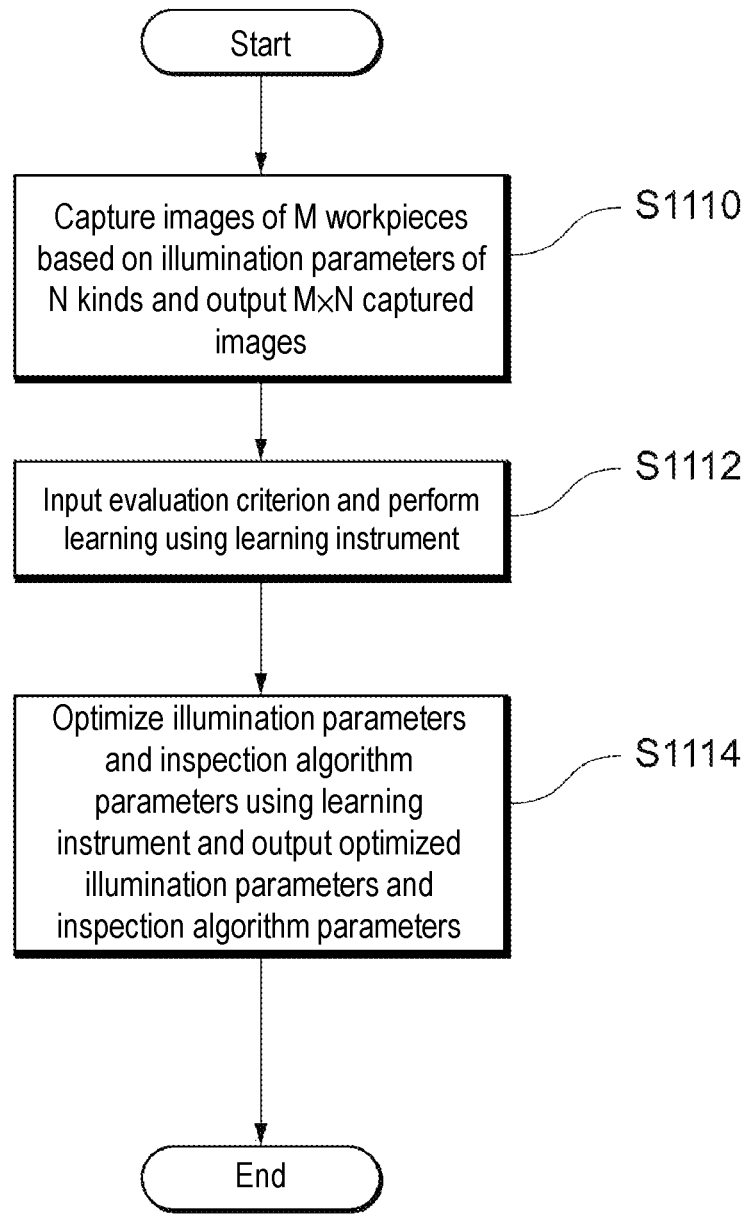
FIG. 11 is a flowchart illustrating the illumination condition setting method in another example of the processing procedure in the image capture device according to another embodiment of the present disclosure.

FIG. 11 is a flowchart illustrating the illumination condition setting method in another example of the processing procedure in the image capture device according to another embodiment of the present disclosure. According to the inspection method which will be described with reference to FIG. 11, robustness with respect to change in workpiece can be improved using two evaluation functions.

In order to secure robustness of inspection performance with respect to change in workpiece, variation in sample images is generally increased by increasing sample images of the workpiece or applying augmentation.

In the optimizing technique including illuminations which has been described so far, since increase in sample images of a workpiece corresponds to increase in the instance number of illumination simulators, there is a disadvantage that it takes more time and effort than simply capturing images of sample images. Regarding a technique for simply resolving this, a technique of devising the evaluation function can be considered.

In the present disclosure, there is an advantage that the percentage of correct answers (loss value) of the inspection algorithm can be direct maximized. On the other hand, since there is no criterion for direct visual evaluation of captured images at all, there is a problem that it is not possible to distinguish whether the parameters are illumination parameters for genuinely illuminating a defect (inspection target) or the parameters are illumination parameters which are extremely optimized only for particular disposition of a workpiece and have no generality. It is not possible to directly maximize the performance of the inspection algorithm by visually evaluating the quality of an inspection image, but since it is established on the basis of prerequisite knowledge based on feeling and experience of human, there is an advantage that robustness can be secured. For this reason, as indicated in the following Expression (12), it is conceivable to add a sensory evaluation criterion h(u) (for example, intra-regional contrast) based on human subjectivity to the loss function for optimization.

[Math. 13]

$$L'(f_i,v_i|\theta_L,\theta_D)=L(f_i,v_i|\theta_L,\theta_D)+\lambda h(f_i(\theta_L)) \quad (12)$$

Here, λ is a parameter for determining a balance of emphasis between the performance (loss value) of the inspection algorithm and the sensory evaluation criterion.

A process of the method will be described in detail with reference to FIG. 11. As illustrated in FIG. 11, in Step S1110, captured images are obtained by capturing images of the workpiece 4. The step can be referred to Steps S410, S50, and S810. In Step S1112, in addition to inputting estimated images acquired from the captured images to the learning instrument 1431, an evaluation criterion is input, and learning is performed. "An evaluation criterion" said herein can include an evaluation criterion based on prerequisite knowledge based on feeling and experience of human described above and can include an evaluation criterion or the like based on an existing mathematical algorithm used for image analysis. In Step S1114, optimized inspection illumination parameters are obtained by minimizing the loss function of the learning instrument 1431.

Regarding a form in which the method is applied, there is a variation as described below. For example, in a simplification method in which $\theta_L$ is obtained after $\theta_D$ described above is obtained, in the step of obtaining each of the parameters, values having different λ or the sensory evaluation criterion h(u) may be used. For example, it is conceivable to adopt a pattern in which $\theta_D$ is obtained from only the percentage of correct answers (λ=0), the weight of the sensory evaluation criterion is raised for $\theta_L$ (λ has a large value), and the like.

In the inspection method which has been described with reference to FIG. 11, since influence of the environment is taken into account, robustness against unevenness in workpiece can be enhanced, and performance of the inspection system in its entirety can be improved.

5.5: Fifth Modification Example

Hereinafter, a specific an example of a configuration of an illumination simulator will be described. Generally, illuminating is uniquely defined by a far-field pattern of light, that is, a continuous function (also referred to as an angle spectrum) indicating an intensity distribution when decomposed at the basis of parallel light. The upper limit for the resolution of this continuous function is determined by the size of the workpiece 4 and the opening of the image capturing system, and since a small workpiece does not have a small angular resolution, a component having a high spatial frequency can be disregarded. However, there is still a great deal of freedom in the illumination pattern, and thus some parametric model is required for modeling.

An illumination model is broadly divided into a linear model and a nonlinear model depending on specific illumination conditions for a constraint condition under which a parameter vector showing adjustment of illumination is expressed as a parametric function. It is easier for a linear model to estimate a model parameter, but the degree of freedom for illumination is limited.

Figure 12:
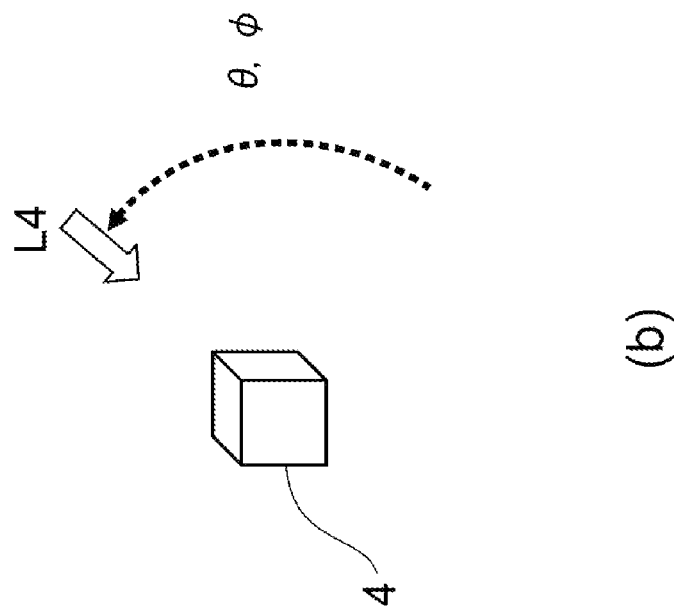
In FIG. 12, (a) and (b) are explanatory views for an illumination pattern of the illumination condition setting method in the image capture device according to the embodiment of the present disclosure.
Figure 12:
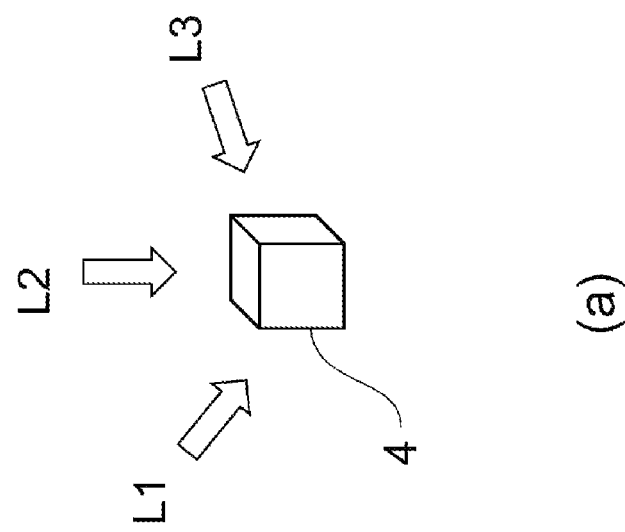
Figure 13:
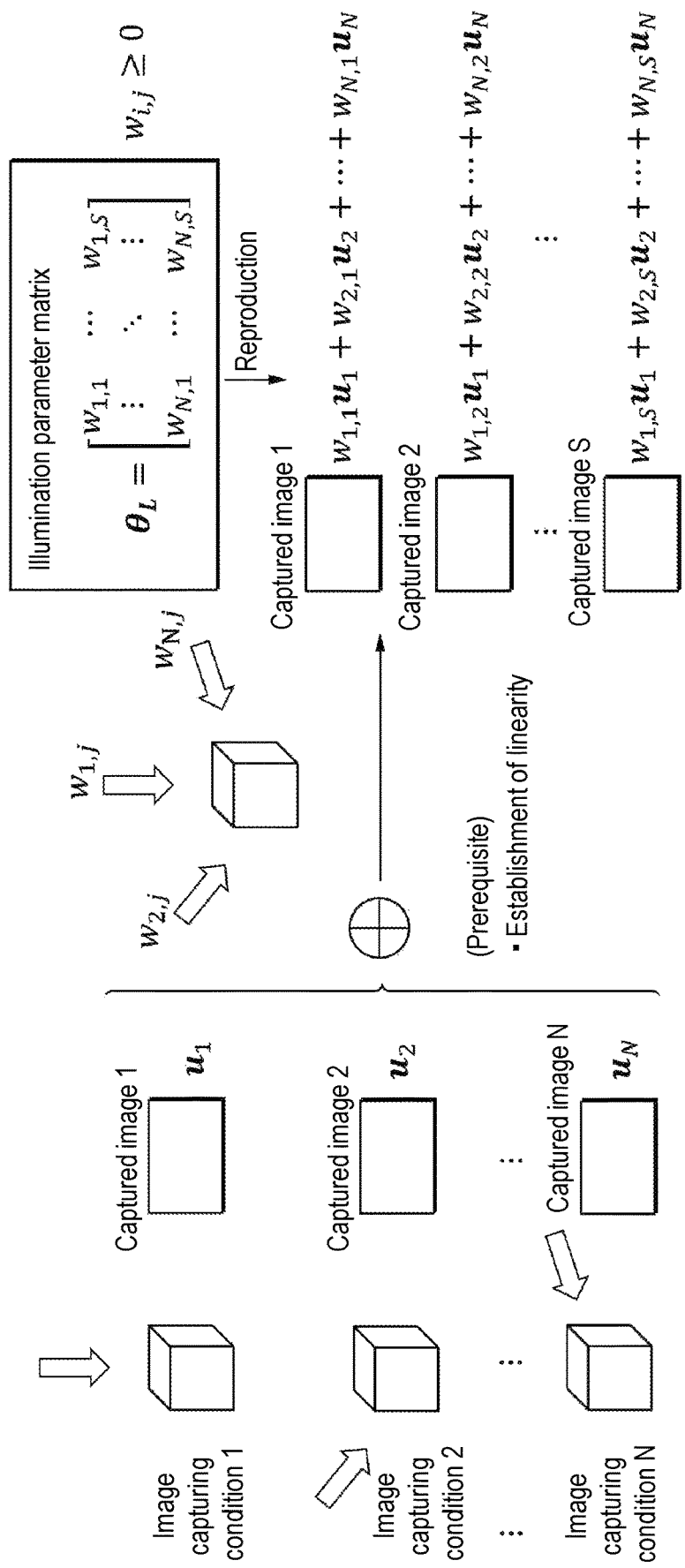
FIG. 13 is a view schematically illustrating an example of a linear illumination pattern.
Figure 14:
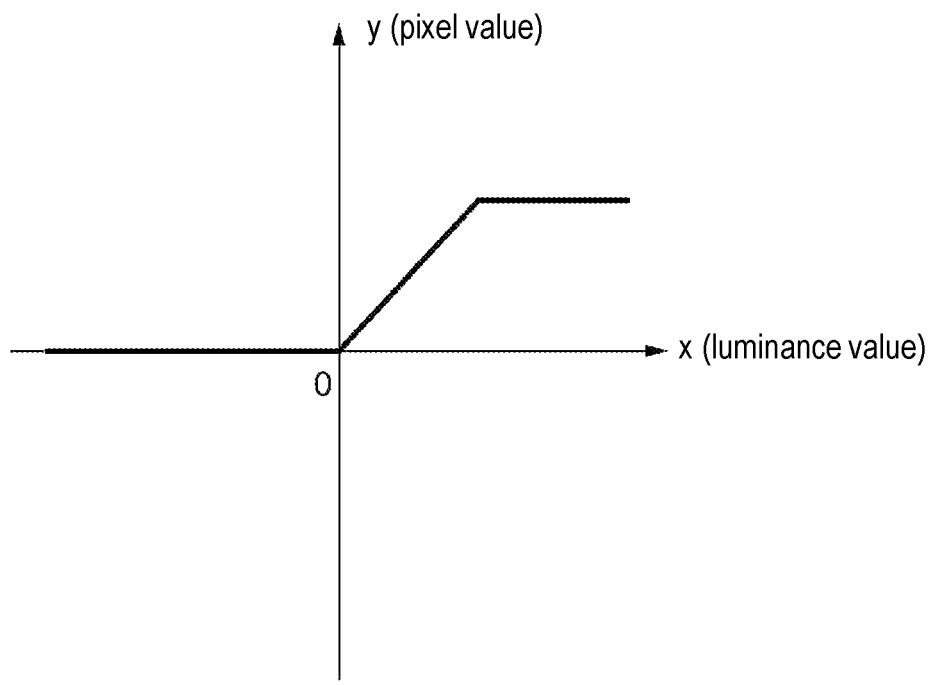
FIG. 14 is a view schematically illustrating an example of a linear function for brightness.

Hereinafter, the illumination pattern of the inspection method according to the embodiment of the present disclosure will be described with reference to (a) and (b) of FIG. 12, and FIGS. 13 and 14. (a) of FIG. 12 and FIG. 13 illustrate examples of a linear illumination pattern. In the linear illumination pattern, on the basis of the total of linear superposition of captured images corresponding to the illumination parameters included in the image data set, the estimated images of the workpiece 4 when illuminating is performed based on variable illumination parameters can be generated.

(a) of FIG. 12 illustrates a case of three light sources. A light source L1, a light source L2, and a light source L3 illuminate the workpiece 4 at different light emitting positions. However, as necessary, the number of light sources need only be two or larger. For example, a case of having N light sources will be described below as an example. In summary, a linear model adjusts the intensity of each of N illuminations which have been fixed. When the intensity of ith (1≤i≤N) illumination is $W_i$, the illumination parameter vector for kth image capturing in multi-shot image capturing is expressed as in the following Expression (13). This corresponds to a kth column vector in a parameter matrix of multi-shot image capturing indicated by the foregoing Expression (3). However, in the following, the index k will be omitted in order to focus on image capturing of one shot in multi-shot image capturing.

[Math. 14]

$$\theta_L[w_1,w_2,\ldots,w_N]^T \quad (13)$$

When a distant pattern of illumination is expressed as Ψ(θ, φ), it will be specifically expressed as in the following Expression (14) in a linear model.

[Math. 15]

$$\Psi(\theta,\varphi)=w_1\Psi_1(\theta,\varphi)+w_2\Psi_2(\theta,\varphi)+\ldots+w_N\Psi_N(\theta,\varphi) \quad (14)$$

In the foregoing expression, $\Psi_i(\theta, \varphi)$ is a distant pattern of the ith illumination, and this becomes a model equivalent to a radial basis function (RBF) network. As is clear from the definition, this is a linear system which is linear with respect to the parameter and in which the principle of superposition is established.

This relationship is also established with respect to a captured image. For example, when an image acquired while having only the ith illumination turned on ($w_i$=1) and other illuminations are turned off ($w_j$=0, j≠i) is marked as $u_j$, the estimated images with respect to the illumination parameters can be obtained by the following Expression (15).

[Math. 16]

$$w_1u_1+w_2u_2+\ldots+w_Nu_N=A\theta_L \quad (15)$$

Here, ordinarily, A is a vertically long matrix. In an actual environment, nonlinear phenomena in which directivity of a light source varies depending on the intensity of light, and the like can be considered, but it is assumed that they are negligibly small. In addition, since linearity is not established due to pixel saturation, a nonlinear linearity function g(x) is applied. Generally, it becomes a model as in the following Expression (16). However, it is assumed that g(x) is computation with respect to each element of the vector. Examples of variation of a linear function for brightness include that illustrated in FIG. 14.

[Math. 17]

$$u=g(A\theta_L) \quad (16)$$

In this case, a parameter for the illumination simulator becomes a matrix A, and estimation (=learning) of A becomes a problem of identifying a linear system. It can be easily realized by performing measurement N times using an arbitrary primary independent basis. Specifically, on the assumption that the brightness of each of illuminations at the time of measurement is within a range in which linearity is established, N basis vectors used measure at the time of measurement is expressed as follows.

[Math. 18]
$$\{\theta_L^{(i)}\}_{i=1}^N \quad (18)$$

In this case, a relationship expressed by the following Expressions (17) and (18) is established.

[Math. 19]

$$[u_1, u_2, \ldots, u_N] = A[\theta_L^{(1)}, \theta_L^{(2)}, \ldots, \theta_L^{(N)}] + [n_1, n_2, \ldots, n_N] \quad (17)$$

$$U = AX + N \quad (18)$$

Here, $n_j$ is additive noise generated in a CMOS sensor at the time of image capturing. Ordinarily, a normal distribution is established, and dispersion thereof is determined by the SN ratio of the image capturing system. When A is obtained from this relational expression, there are various methods such as maximum likelihood (ML) estimation which is best linear unbiased estimation (BLUE) and a minimum mean square error (MMSE) estimation under conditions in which both A and N follow a known Gauss distribution. Generally, since statistical properties of A in this circumstance are unknown, the ML estimation will be used below. The amount of estimation of A can be obtained by the following Expression (19).

[Math. 20]

$$\hat{A} = UX^{-1} \quad (19)$$

The estimated amount of error at this time is expressed by the following Expression (20).

[Math. 21]

$$\mathop{\mathbb{E}}_{\hat{A}} \|\hat{A} - A\|_{HS}^2 = \quad (20)$$

$$\mathop{\mathbb{E}}_{N} \|NX^{-1}\|_{HS}^2 = \mathop{\mathbb{E}}_{N}\langle NX^{-1}, NX^{-1}\rangle_{HS} = \mathop{\mathbb{E}}_{N}\langle N^T N, X^{-1}(X^{-1})^T\rangle_{HS} = P\sum_{i=1}^{N}\frac{\sigma^2}{\lambda_i^2}$$

Here, σ is a standard deviation of noise, λ is a singular value of X, and P is the number of pixels in an image. HS indicates the Hilbert-Schmidt inner product or the norm of a matrix. As is clear from the foregoing expression, the total estimated amount of error decreases as the singular value of X is increased, and this simply corresponds to increase in SN of the system. When the total of the singular values of X has been determined (the total of signal power is determined), it is known that an error in estimation becomes the smallest when λ has the same value in all, and this denotes that it is most efficient to use an orthonormal basis as an illumination parameter vector at the time of observation. In the following, based on the discussion so far, measurement patterns of three representative illumination models will be described.

(1) Standard Basis

When a standard basis (simplest pattern) is used, the illumination pattern at the time of measurement is expressed as in the following Expression (21).

[Math. 22]

$$\theta_L^{(1)} = (1, 0, 0, \ldots, 0)^T \quad (21)$$

$$\theta_L^{(1)} = (1, 0, 0, \ldots, 0)^T$$

$$\vdots$$

Since this is an orthonormal basis, the best estimation is applied in the meaning of the discussion described above, but the quantity of light within a screen is not uniform, and thus there is a possibility that influence of noise or a dark current is significantly received.

(2) Linear Independence & Conditions

Regarding illumination parameters for measurement, various linear independent patterns can be considered. For this reason, it is possible to select a pattern which can satisfy the conditions after some conditions are applied. For example, the basis is obtained by applying conditions such as brightness within a designated range not falling below a certain value. Similar to the discussion so far, the performance becomes the best in the case of an orthonormal basis. However, it is obtained under restrictions that the brightness cannot take a negative value, it is generally difficult to have an orthogonal basis or an orthonormal basis.

(3) Lengthy basis

The number of bases for measurement is not necessarily equivalent to the number N of illuminations and may be a value larger than N. An advantage of being larger than N is that the SN ratio can be increased and more accurate estimation can be performed. In this case, since an inverse matrix of X is not present, estimation is performed instead as in the following Expression (22).

[Math. 23]

$$\hat{A} = UX^+ \quad (22)$$

Here, $X^+$ is a Moore-Penrose general inverse matrix of X. Similarly, in this case as well, in order to maximize the performance of estimation, it is desirable that the squares of the singular values of X become the same value. It is known that pseudo orthogonal bases (POB) are the best way to realize this. For example, Masashi Sugiyama and Hidemitsu Ogawa, "Pseudo Orthogonal Bases Give the Optimal Generalization Capability in Neural Network Learning" (http://www.ms.k.u-tokyo.ac.jp/1999/SPIE99.pdf, 1999) can be referred to. Similar to the discussion so far, bases may be obtained by applying other conditions.

Hereinabove, an example of a linear illumination pattern has been described with reference to (a) of FIG. 12. Hereinafter, an example of a nonlinear illumination pattern will be described with reference to (b) of FIG. 12. In a nonlinear illumination pattern, it is possible to generate estimated images of the workpiece 4 at the time of illuminating based on variable illumination parameters using a nonlinear estimated function relating to the illumination parameters on the basis of image data sets.

(b) of FIG. 12 illustrates a case in which there is one light source, and a light source L4 illuminates the workpiece 4 at a different light emitting position. However, as necessary, the number of light sources can be two or larger. For example, a case of having N light sources will be described below as an example.

Regarding a nonlinear model, all those not applicable to the linear model described above will be handled. As a simple example, there is a case of using N illuminations of which the incident angle and the brightness can be adjusted.

When the quantity of light is marked as $w_i$ and the incident angle is marked as $(\theta_i, \varphi_i)$, the parameter vector can be expressed as in the following Expression (23).

[Math. 24]

$$\theta_L = (w_1, \theta_1, \varphi_1, w_2, \theta_2, \varphi_2, \ldots, w_N, \theta_N, \varphi_N)^T \qquad (23)$$

The distant pattern at this time becomes as in the following Expression (24) and is not linear with respect to the parameter vector.

[Math. 25]

$$\psi(\theta, \varphi) = \sum_{i=1}^{N} w_i \psi_i(\theta - \theta_i, \varphi - \varphi_i) \qquad (24)$$

In this case, it is difficult to define a general mathematical model. However, for example, it is possible to use an arbitrary image generation model such as a generative adversarial network (GAN) system that is a technique of generating an image using deep learning which has been recently proposed, or an auto encoder (AE) system. However, generally, it is considered that the number of times of image capturing necessary for learning is larger than that in the case of a linear model, and thus the degree of difficulty of learning is high. However, since a nonlinear model is expression having a considerably high degree of freedom, a search space in the meaning of finding an optimal illumination becomes considerably wide.

Hereinafter, a specific example of a model which is simplified to be able to be utilized under particularly limited conditions will be described. In consideration of circumstances in which only diffuse scattered light is modeled, on the assumption that it follows a Lambert model, an arbitrary illumination can be expressed by linear bonding of three basis functions. Although this model seems to be linear, the process of obtaining a mixing coefficient of the basis from parametric illumination conditions is nonlinear. Therefore, it belongs to a nonlinear illumination simulator. Specifically, a model can be defined as in the following Expressions (25) to (28).

[Math. 26]

$$u = g(BCd(\theta_L)) \qquad (25)$$

$$[d(\theta_L)]_q = \sum_{i=1}^{N} w_i \exp\left(-\frac{|\max(r^T(\theta_i, \varphi_i) r(\theta_S^{(q)}, \varphi_S^{(q)}), 0)|^2}{\sigma^2}\right) \qquad (26)$$

$$r(\theta, \varphi) = [\cos\varphi\cos\theta, \sin\varphi\cos\theta, \sin\theta]^T \qquad (27)$$

$$C = [t_1, t_2, \ldots, t_Q] \qquad (28)$$

Here, B is a P×3 matrix (P indicates the number of pixels in an image), C is a 3×Q matrix, and $d(\theta_L)$ is nonlinear with respect to the illumination parameters in a Q-dimensional column vector.

$$\{(\theta_S^{(q)}, \varphi_S^{(q)})\}_{q=1}^{Q} \qquad [\text{Math. 27}]$$

This is a sequence of sampling points on an arbitrary sphere, and they are set to have equal intervals therebetween as much as possible on a sphere, such as HEALPix. The number Q of sampling points is set such that a solid angle range which can be set as the illumination parameter can be covered by a sufficient resolution. The factor $l_q$ indicates a light source direction vector when light is incident to a workpiece from the following spherical coordinates.

$$(\theta_S^{(q)}, \varphi_S^{(q)}) \qquad [\text{Math. 28}]$$

The mathematical meaning of this expression is that the illumination parameter is once mapped to a high-dimensional (Q-dimensional) space by a nonlinear map d and luminance values of the pixels are calculated by a linear map from above the space, but it intuitively has the following meaning.

First, from input illumination parameters, on the assumption that each illumination has an angular spread of a Gauss distribution with the standard deviation σ, the incident angle is discretized and expressed as a value on each point of spherical sampling. Next, in each of the sampling points (the incident angle corresponding thereto), mixing coefficients (direction vectors of illuminations) of three basis functions of the Lambert model are obtained by the matrix C, and the basis function indicated by the matrix B is mixed. Last, the linearity function g is applied. Since the matrix B is a matrix relying on the workpiece, the matrix B is estimated from the captured image set measured by changing the illumination parameters at least three times. The matrix C may be calibrated and obtained.

§ 6 APPENDIX

The embodiment and the modification examples which have been described above are provided to facilitate understanding of the present invention and should not be interpreted to limit the present invention. Each of the elements, disposition thereof, materials, conditions, shapes, sizes, and the like included in the embodiment and the modification examples are not limited to the examples and can be suitably changed. In addition, configurations indicated in different embodiments and modification examples can also be partially replaced or combined.

That is, details of the present disclosure have been described with the inspection system illustrated in FIG. 1. However, the principle of the present disclosure can be applied when there is a need to capture images by setting various other illumination conditions. For example, the principle of the present disclosure can also be applied in a facial recognition system in which a face is taken as an object, images of the face are captured by illuminating the face, and the face is identified from the input captured images through machine learning.

In the case of a facial recognition system, a face is illuminated with a light source in which illumination parameters are able to be changed. In addition, images of the face are captured using an image capture device under various illumination conditions. Here, known label data is applied to the face, and the label data can be the name of the person, for example. Next, on the basis of the foregoing "illumination simulator", estimated images of the face can be generated. In addition, in these estimated images and the label data of the face, using learning performed with a machine learning model of the facial recognition system, on the basis of a result of comparison between a result of estimation performed with the machine learning model and the label data of the face, the illumination conditions and the inspection algorithm parameters can be set by optimizing the illumination parameters and the inspection algorithm parameters for the machine learning model at the same time. Here, the inspection algorithm parameters indicate algorithm parameters used when a machine learning model is applied in face identification.

In addition, when a device, a system, or a portion thereof for setting illumination conditions described above at the time of inspecting an object is realized in a form of a software functioning unit and is sold and used as a single product, it can be stored in a computer readable storage medium. Accordingly, the essence of the technical proposal of the present invention, parts which contribute to the existing technologies, or all or some of the technical proposal can be realized in a formed of a software product, and a computer-software product including a command for realizing all or some in the step of the method disclosed in each of the examples of the present invention can be stored in a storage medium in a computer device (it can be a personal computer, a server, a network device, or the like). The storage medium described above includes various media, such as a USB, a read-only memory (ROM), a random access memory (RAM), a mobile hard disk, a floppy disk, or an optical disc, which can store program codes.

Moreover, in addition to those described above, examples of the index representing inspection performance include a relevance ratio, a reproduction rate, an F value, an area of a receiver operating characteristic (ROC) curve, a number which has been correctly judged as a positive number (TP: true positive), a number which has been erroneously judged as a positive number (FP: false positive), a number which has been erroneously decided as a negative number (FN: false negative), and a number which has been correctly decided as a negative value (TN: true negative).

(Appendix 1)

There is provided an image capture method used when inspecting an object (4) using an inspection module (100) including a machine learning model generated based on learning data including an image. The image capture method includes illuminating the object (4) with a light source (L) in which an illumination parameter during image capture of the object (4) having known label data is able to be changed, capturing images of the object (4) using an image sensor (102) based on a plurality of the illumination parameters, and acquiring a plurality of captured images; generating an estimated image of the object (4) at the time of illumination based on the illumination parameter on the basis of an image data set obtained by associating the captured images with the illumination parameter corresponding to the captured images; setting a maximum number of captured images permitted for the object (4); and using the estimated image corresponding to the illumination parameter and the label data of the object (4) for learning performed with the machine learning model for each number of images equal to or smaller than the maximum number of captured images, optimizing the illumination parameter and an inspection algorithm parameter for the machine learning model on the basis of a result of comparison between a result of estimation performed with the machine learning model and the label data of the object (4), calculating an index representing inspection performance expected when the each number of images is captured, and presenting the index to a user.

(Appendix 2)

In the image capture method according to Appendix 1, the generating the estimated image of the object (4) includes preparing a plurality of the corresponding image data sets for the objects (4) of a plurality of kinds, and generating a plurality of the estimated images respectively corresponding to the objects of a plurality of kinds at the time of illumination based on the illumination parameter on the basis of the plurality of the image data sets.

(Appendix 3)

There is provided an image capture method used when inspecting an object (4) using an inspection module (100) including a machine learning model generated based on learning data including an image. The image capture method includes illuminating the object (4) with a light source (L) in which an illumination parameter during image capture of the object having corresponding label data is able to be changed, capturing images of the object (4) using an image sensor based on a plurality of the illumination parameters, and acquiring a plurality of captured images; generating an estimated image of the object (4) at the time of illumination based on the illumination parameter on the basis of an image data set obtained by associating the captured images with the illumination parameter corresponding to the captured images; setting a maximum number of captured images permitted for the object (4); and using the estimated image corresponding to the illumination parameter for the machine learning model that has finished learning for each number of images equal to or smaller than the maximum number of captured images, optimizing only the illumination parameter on the basis of a result of comparison between a result of estimation performed with the machine learning model and the label data of the object (4), calculating an index representing inspection performance expected when the each number of images is captured, and presenting the index to a user.

(Appendix 4)

In the image capture method according to Appendix 3, the using the estimated image for the machine learning model that has finished learning includes using learning data including the estimated image and label data showing a corresponding to-be-inspected feature of the object (4) for additional learning performed with the machine learning model, and updating some or all of inspection algorithm parameters for the machine learning model; and matching the result of estimation of the machine learning model and the label data to each other by optimizing some or all of the inspection algorithm parameters for the machine learning model and the illumination parameters.

(Appendix 5)

In the image capture method according to any one of Appendices 1 to 4, the optimizing the illumination parameter includes selecting the illumination parameter that minimizes a loss function showing the result of comparison, and the selecting indicates selecting the illumination parameter that minimizes the loss function in terms of an average loss value of the illumination parameter within a predetermined range.

(Appendix 6)

In the image capture method according to any one of Appendices 1 to 5, the generating the estimated image of the object (4) includes generating the estimated image of the object on the basis of a sum total of weighted linear superposition of the captured images settled on the basis of the illumination parameter and the captured images included in the image data set.

(Appendix 7)

In the image capture method according to any one of Appendices 1 to 5, the generating the estimated image of the object (4) includes generating the estimated image of the object (4) using a nonlinear estimated function relating to the illumination parameter on the basis of the image data set.

(Appendix 8)

In the image capture method according to any one of Appendices 1 to 7, indices of a plurality of kinds are calculated as indices representing the inspection performance and are presented to the user.

(Appendix 9)

There is provided an image capture device (1) used when inspecting an object (4) using an inspection module (100) including a machine learning model generated based on learning data including an image. The image capture device (1) includes an acquisition unit that illuminates the object (4) with a light source (L) in which an illumination parameter during image capture of the object (4) having known label data is able to be changed, captures images of the object (4) using an image sensor (102) based on a plurality of the illumination parameters, and acquires a plurality of captured images; a generation unit that generates an estimated image of the object (4) at the time of illumination based on the illumination parameter on the basis of an image data set obtained by associating the captured images with the illumination parameter corresponding to the captured images; a setting unit that sets a maximum number of captured images permitted for the object (4); and a control unit that uses the estimated image corresponding to the illumination parameter and the label data of the object for learning performed with the machine learning model for each number of images equal to or smaller than the maximum number of captured images, optimizes the illumination parameter and an inspection algorithm parameter for the machine learning model on the basis of a result of comparison between a result of estimation performed with the machine learning model and the label data of the object (4), calculates an index representing inspection performance expected when the each number of images is captured, and presents the index to a user.

(Appendix 10)

There is provided an image capture device (1) used when inspecting an object (4) using an inspection module (100) including a machine learning model generated based on learning data including an image. The image capture device (1) includes an acquisition unit that illuminates the object (4) with a light source (L) in which an illumination parameter during image capture of the object (4) having corresponding label data is able to be changed, captures images of the object (4) using an image sensor (102) based on a plurality of the illumination parameters, and acquires a plurality of captured images; a generation unit that generates an estimated image of the object (4) at the time of illumination based on the illumination parameter on the basis of an image data set obtained by associating the captured images with the illumination parameter corresponding to the captured images; a setting unit that sets a maximum number of captured images permitted for the object (4); and a control unit that uses the estimated image corresponding to the illumination parameters for the machine learning model that has finished learning for each number of images equal to or smaller than the maximum number of captured images, optimizes only the illumination parameter on the basis of a result of comparison between a result of estimation performed with the machine learning model and the label data of the object (4), calculates an index representing inspection performance expected when the each number of images is captured, and presents the index to a user.

This application is based upon Japanese Patent Application No. 2018-211495, filed Nov. 9, 2018, the content of which is incorporated herein by reference.

The invention claimed is:

1. An image capture method used when inspecting an object using a machine learning model generated based on learning data comprising an image, the image capture method comprising:

illuminating the object with a light source in which an illumination parameter during image capture of the object having known label data is able to be changed, capturing images of the object using an image sensor based on a plurality of the illumination parameters, and acquiring a plurality of captured images;

generating an estimated image of the object at the time of illumination based on the illumination parameter on the basis of an image data set obtained by associating the captured images with the illumination parameter corresponding to the captured images;

setting a maximum number of captured images permitted for the object; and using the estimated image corresponding to the illumination parameter and the label data of the object for learning performed with the machine learning model for each number of images equal to or smaller than the maximum number of captured images, optimizing the illumination parameter and an inspection algorithm parameter for the machine learning model on the basis of a result of comparison between a result of estimation performed with the machine learning model and the label data of the object, calculating an index representing inspection performance expected when the each number of images is captured, and presenting the index to a user.

2. The image capture method according to claim 1, wherein the generating the estimated image of the object comprises preparing a plurality of the corresponding image data sets for the objects of a plurality of kinds, and generating a plurality of the estimated images respectively corresponding to the objects of a plurality of kinds at the time of illumination based on the illumination parameter on the basis of the plurality of the image data sets.

3. An image capture method used when inspecting an object using a machine learning model generated based on learning data comprising an image, the image capture method comprising:

illuminating the object with a light source in which an illumination parameter during image capture of the object having corresponding label data is able to be changed, capturing images of the object using an image sensor based on a plurality of the illumination parameters, and acquiring a plurality of captured images;

generating an estimated image of the object at the time of illumination based on the illumination parameter on the basis of an image data set obtained by associating the captured images with the illumination parameter corresponding to the captured images;

setting a maximum number of captured images permitted for the object; and using the estimated image corresponding to the illumination parameter for the machine learning model that has finished learning for each number of images equal to or smaller than the maximum number of captured images, optimizing only the illumination parameter on the basis of a result of comparison between a result of estimation performed with the machine learning model and the label data of the object, calculating an index representing inspection performance expected when the each number of images is captured, and presenting the index to a user.

4. The image capture method according to claim 3, wherein the using the estimated image for the machine learning model that has finished learning comprises using learning data comprising the estimated image and label data showing a corresponding to-be-inspected feature of the object for additional learning performed with the machine learning model, and updating some or all of inspection algorithm parameters for the machine learning model, and matching the result of estimation of the machine learning model and the label data to each other by optimizing some or all of the inspection algorithm parameters for the machine learning model and the illumination parameter.

5. The image capture method according to claim 1, wherein the optimizing the illumination parameter comprises selecting the illumination parameter that minimizes a loss function showing the result of comparison, and the selecting indicates selecting the illumination parameter that minimizes the loss function in terms of an average loss value of the illumination parameter within a predetermined range.

6. The image capture method according to claim 1, wherein the generating the estimated image of the object comprises generating the estimated image of the object on the basis of a sum total of weighted linear superposition of the captured images settled on the basis of the illumination parameter and the captured images comprised in the image data set.

7. The image capture method according to claim 1, wherein the generating the estimated image of the object comprises generating the estimated image of the object using a nonlinear estimated function relating to the illumination parameter on the basis of the image data set.

8. The image capture method according to claim 1, wherein indices of a plurality of kinds are calculated as indices representing the inspection performance and are presented to the user.

9. An image capture device used when inspecting an object using a machine learning model generated based on learning data comprising an image, the image capture device comprising:
   a light source that illuminates the object, wherein an illumination parameter in the light source during image capture of the object having known label data is able to be changed;
   an image sensor that captures images of the object based on a plurality of the illumination parameters, and acquires a plurality of captured images; and
   a processor, configured to:
      generate an estimated image of the object at the time of illumination based on the illumination parameter on the basis of an image data set obtained by associating the captured images with the illumination parameter corresponding to the captured images;
      set a maximum number of captured images permitted for the object; and
      use the estimated image corresponding to the illumination parameter and the label data of the object for learning performed with the machine learning model for each number of images equal to or smaller than the maximum number of captured images, optimize the illumination parameter and an inspection algorithm parameter for the machine learning model on the basis of a result of comparison between a result of estimation performed with the machine learning model and the label data of the object, calculate an index representing inspection performance expected when the each number of images is captured, and present the index to a user.

10. An image capture device used when inspecting an object using a machine learning model generated based on learning data comprising an image, the image capture device comprising:
   a light source that illuminates the object, wherein an illumination parameter in the light source during image capture of the object having corresponding label data is able to be changed;
   an image sensor that captures images of the object based on a plurality of the illumination parameters, and acquires a plurality of captured images; and
   a processor, configured to:
      generate an estimated image of the object at the time of illumination based on the illumination parameter on the basis of an image data set obtained by associating the captured images with the illumination parameter corresponding to the captured images;
      set a maximum number of captured images permitted for the object; and
      use the estimated image corresponding to the illumination parameter for the machine learning model that has finished learning for each number of images equal to or smaller than the maximum number of captured images, optimize only the illumination parameter on the basis of a result of comparison between a result of estimation performed with the machine learning model and the label data of the object, calculate an index representing inspection perfonnance expected when the each number of images is captured, and present the index to a user.

* * * * *